US009760457B2

(12) United States Patent
Sims et al.

(10) Patent No.: US 9,760,457 B2
(45) Date of Patent: *Sep. 12, 2017

(54) SYSTEM, METHOD AND COMPUTER PROGRAM PRODUCT FOR RECOVERING STUB FILES

(71) Applicant: KIP CR P1 LP, New York, NY (US)

(72) Inventors: Robert C. Sims, Round Rock, TX (US); Brian J. Bianchi, Cedar Park, TX (US); William H. Moody, II, Austin, TX (US)

(73) Assignee: KIP CR P1 LP, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/593,657

(22) Filed: Jan. 9, 2015

(65) Prior Publication Data

US 2015/0161010 A1    Jun. 11, 2015

Related U.S. Application Data

(63) Continuation of application No. 13/485,060, filed on May 31, 2012, now Pat. No. 8,977,827.

(51) Int. Cl.
*G06F 12/08* (2016.01)
*G06F 11/20* (2006.01)
*G06F 11/14* (2006.01)
*G06F 17/30* (2006.01)

(52) U.S. Cl.
CPC ...... *G06F 11/2058* (2013.01); *G06F 11/1435* (2013.01); *G06F 11/1451* (2013.01); *G06F 11/1456* (2013.01); *G06F 11/1469* (2013.01); *G06F 11/2069* (2013.01); *G06F 17/30203* (2013.01); *G06F 17/30902* (2013.01); *G06F 2201/84* (2013.01)

(58) Field of Classification Search
CPC ............. G06F 11/1451; G06F 11/1456; G06F 11/1469; G06F 11/2058; G06F 11/2069; G06F 2201/84
USPC ................................. 711/4, 5, 113, 114, 162
See application file for complete search history.

(56) References Cited

U.S. PATENT DOCUMENTS

| 5,403,639 A | 4/1995 | Belsan |
| 5,488,702 A | 1/1996 | Byers |
| 5,740,430 A | 4/1998 | Rosenberg et al. |
| 5,829,038 A | 10/1998 | Merrell et al. |
| 5,829,046 A | 10/1998 | Tzelnic et al. |
| 6,023,709 A | 2/2000 | Anglin et al. |
| 6,029,179 A | 2/2000 | Kishi |
| 6,085,234 A | 7/2000 | Pitts |
| 6,463,513 B1 | 10/2002 | Bish et al. |

(Continued)

FOREIGN PATENT DOCUMENTS

| JP | 2003-125186 A | 4/2003 |
| JP | 2006-121176 A | 5/2006 |
| WO | WO 00/43889 A1 | 7/2000 |

OTHER PUBLICATIONS

Office Action for U.S. Appl. No. 13/847,965, mailed Feb. 20, 2015, 36 pgs.

(Continued)

*Primary Examiner* — Gary Portka
(74) *Attorney, Agent, or Firm* — Sprinkle IP Law Group

(57) ABSTRACT

A read cache may include portions of files stored on media of a media library. Embodiments described herein may include systems and methods for restoring a read cache, including restoring stub files to a read cache on an ad hoc basis.

21 Claims, 19 Drawing Sheets

(56) References Cited

U.S. PATENT DOCUMENTS

| | | | |
|---|---|---|---|
| 6,502,165 | B1 | 12/2002 | Kishi |
| 6,549,992 | B1 | 4/2003 | Armangau et al. |
| 7,139,791 | B1 | 11/2006 | Coleman |
| 7,266,556 | B1 | 9/2007 | Coates |
| 7,681,069 | B1 | 3/2010 | Chellappa et al. |
| 7,752,384 | B2 | 7/2010 | Moody et al. |
| 7,941,597 | B2 | 5/2011 | Moody et al. |
| 8,131,924 | B1 | 3/2012 | Frandzel et al. |
| 8,285,758 | B1 | 10/2012 | Bono et al. |
| 8,453,010 | B2 | 5/2013 | Thompson et al. |
| 8,527,561 | B1 | 9/2013 | Moody, II et al. |
| 8,566,517 | B1 | 10/2013 | Sims et al. |
| 8,675,296 | B2 | 3/2014 | Amir et al. |
| 8,782,363 | B2 | 7/2014 | Shitomi |
| 8,832,365 | B1 | 9/2014 | Sims et al. |
| 8,935,431 | B2 | 1/2015 | Oehme et al. |
| 8,977,827 | B1 | 3/2015 | Sims et al. |
| 9,323,776 | B2 | 4/2016 | Sims et al. |
| 9,563,365 | B2 | 2/2017 | Lenox |
| 2002/0087783 | A1 | 7/2002 | Leonhardt et al. |
| 2002/0095537 | A1 | 7/2002 | Slater et al. |
| 2003/0084368 | A1 | 5/2003 | Sprunt |
| 2003/0135783 | A1 | 7/2003 | Martin et al. |
| 2004/0111485 | A1 | 6/2004 | Mimatsu et al. |
| 2004/0267822 | A1 | 12/2004 | Curran et al. |
| 2005/0188246 | A1 | 8/2005 | Emberty et al. |
| 2006/0123189 | A1 | 6/2006 | Bitner |
| 2006/0126209 | A1 | 6/2006 | Starr et al. |
| 2007/0067364 | A1 | 3/2007 | Barbian et al. |
| 2007/0189708 | A1 | 8/2007 | Lerman et al. |
| 2007/0233953 | A1 | 10/2007 | Shen |
| 2007/0239806 | A1 | 10/2007 | Glover |
| 2008/0015734 | A1 | 1/2008 | Wideman et al. |
| 2008/0077739 | A1 | 3/2008 | Tashiro |
| 2008/0208927 | A1 | 8/2008 | Chikusa |
| 2009/0006543 | A1 | 1/2009 | Smit |
| 2009/0009818 | A1 | 1/2009 | Mita et al. |
| 2009/0164714 | A1 | 6/2009 | Wideman et al. |
| 2009/0171886 | A1 | 7/2009 | Wu et al. |
| 2009/0177836 | A1 | 7/2009 | Mimatsu |
| 2009/0213482 | A1 | 8/2009 | Fujihara |
| 2010/0103549 | A1 | 4/2010 | Murayama et al. |
| 2010/0182887 | A1 | 7/2010 | Moody |
| 2011/0004727 | A1 | 1/2011 | Bitner |
| 2011/0184909 | A1 | 7/2011 | Slater et al. |
| 2011/0196899 | A1 | 8/2011 | Hughes et al. |
| 2011/0238906 | A1 | 9/2011 | Amir |
| 2012/0011336 | A1 | 1/2012 | Saika |
| 2012/0054428 | A1 | 3/2012 | Butt et al. |
| 2012/0158882 | A1 | 6/2012 | Oehme et al. |
| 2012/0179867 | A1 | 7/2012 | Chakravarty |
| 2012/0323934 | A1 | 12/2012 | Amir et al. |
| 2013/0132663 | A1 | 5/2013 | Eleftheriou et al. |
| 2013/0173548 | A1 | 7/2013 | Haustein et al. |
| 2013/0290388 | A1 | 10/2013 | Lenox |
| 2013/0311527 | A1 | 11/2013 | Moody, II et al. |
| 2014/0164693 | A1 | 6/2014 | Hasegawa et al. |
| 2014/0172930 | A1 | 6/2014 | Molaro et al. |
| 2014/0330817 | A1 | 11/2014 | Eleftheriou et al. |
| 2014/0337571 | A1 | 11/2014 | Sims et al. |
| 2016/0203160 | A1 | 7/2016 | Sims et al. |
| 2017/0102885 | A1 | 4/2017 | Lenox |

OTHER PUBLICATIONS

Notice of Allowance for U.S. Appl. No. 14/444,614, mailed Apr. 8, 2015, 10 pgs.

Office Action for U.S. Appl. No. 13/267,743, mailed May 7, 2015, 23 pgs.

Notice of Allowance for U.S. Appl. No. 13/267,665, mailed Jun. 3, 2015, 6 pgs.

Office Action for U.S. Appl. No. 13/950,075, mailed Jun. 26, 2015, 13 pgs.

Pease, David, et al., "The Linear Tape File System," IBM Yamato Lab, 2010, 8 pgs., #978-1-4244-7153-9/10, IEEE, U.S.

Linear Tape File System (LTFS) Format Specification, LTFS Format Version 2.0.0., Mar. 11, 2011, 69 pages, accessed on Sep. 29, 2011 at http://www.trustito.com/LTFS_Format_To%20Print.pdf.

Long Term File System Information Center 1.2.1.1, Overview, LTFS Format, IBM Corp., 2010, 1 pg.

HP Linear Tape File System (LTFS), HP OEM Newsletter, Sep. 2010, 15 pgs.

Anyone Using LTFS with LTO-5? Post, Reduser.net, Sep. 29, 2010, 3 pgs. at <<http://reduser.net/forum/showthread.php?t=50309>>.

Coolen, Ilja, IBM's Long Term Filesystem, short term usage? Apr. 26, 2010, 3 pgs. at <<http://www.iljacoolen.nl/2010/04/ibms-long-term-filesystem-short-term-usage/>>.

Office Action for U.S. Appl. No. 13/109,192, mailed Dec. 17, 2012, 10 pgs.

Office Action for U.S. Appl. No. 13/267,743, mailed Dec. 19, 2012, 13 pgs.

Office Action for U.S. Appl. No. 13/267,743, mailed Jun. 19, 2013, 26 pgs.

International Search Report and Written Opinion for International Patent No. PCT/US2013/038755, mailed Aug. 6, 2013, 10 pgs.

Notice of Allowance for U.S. Appl. No. 13/267,665, mailed Dec. 12, 2013, 6 pgs.

Office Action for U.S. Appl. No. 13/451,812, mailed Dec. 17, 2013, 17 pgs.

Office Action for U.S. Appl. No. 13/485,060, mailed Mar. 19, 2014, 7 pgs.

Office Action for U.S. Appl. No. 13/267,665 mailed Apr. 22, 2014, 12 pgs.

Notice of Allowance for U.S. Appl. No. 13/485,060, mailed Jul. 17, 2014, 2 pgs.

Office Action for U.S. Appl. No. 13/267,743, mailed Aug. 5, 2014, 21 pgs.

Office Action for U.S. Appl. No. 14/444,614, mailed Oct. 7, 2014, 18 pgs.

Office Action for U.S. Appl. No. 13/267,665, mailed Oct. 22, 2014, 4 pgs.

International Preliminary Report on Patentability for PCT/US13/038755, issued Nov. 4, 2014, 6 pgs.

Notice of Allowance for U.S. Appl. No. 13/485,060, mailed Nov. 12, 2014, 4 pgs.

Notice of Allowance for U.S. Appl. No. 14/444,614, mailed Nov. 19, 2015, 6 pgs.

Office Action for U.S. Appl. No. 13/950,075, mailed Nov. 30, 2015, 13 pgs.

Office Action for U.S. Appl. No. 13/847,965, mailed Dec. 14, 2015, 31, pgs.

Notice of Allowance for U.S. Appl. No. 13/267,665, mailed Jan. 15, 2016, 4 pgs.

Office Action for U.S. Appl. No. 13/459,531, mailed Jan. 27, 2016, 22 pgs.

Notice of Allowance for U.S. Appl. No. 14/444,614, mailed Aug. 17, 2015, 6 pgs.

Office Action for U.S. Appl. No. 13/459,531, mailed Aug. 19, 2015, 20 pgs.

Office Action for U.S. Appl. No. 13/847,965, mailed Aug. 24, 2015, 39 pgs.

Office Action for U.S. Appl. No. 13/847,965, mailed Jun. 29, 2016, 47 pgs.

Notice of Allowance for U.S. Appl. No. 13/459,531, mailed Jun. 29, 2016, 7 pgs.

Office Action for U.S. Appl. No. 13/267,743, mailed Mar. 22, 2016, 27 pgs.

Office Action for U.S. Appl. No. 13/950,075, mailed Apr. 15, 2016, 11 pgs.

Office Action for U.S. Appl. No. 13/267,665, dated Aug. 15, 2016, 23 pgs.

Notice of Allowance for U.S. Appl. No. 13/950,075, dated Sep. 30, 2016, 5 pgs.

Office Action for U.S. Appl. No. 13/267,743, dated Oct. 5, 2016, 30 pgs.

(56) References Cited

OTHER PUBLICATIONS

Office Action for U.S. Appl. No. 15/072,407, dated Nov. 28, 2016, 20 pgs.
Notice of Allowance for U.S. Appl. No. 13/459,531, dated Nov. 30, 2016, 10 pgs.
Office Action for U.S. Appl. No. 13/847,965, dated Feb. 2, 2017, 54 pgs.
Office Action for U.S. Appl. No. 13/267,665, dated Feb. 27, 2017, 28 pgs.
Office Action for U.S. Appl. No. 13/950,075, dated Mar. 2, 2017, 7 pgs.
Office Action for U.S. Appl. No. 13/267,743, dated Mar. 21, 2017, 32 pgs.
Office Action for U.S. Appl. No. 15/299,210, dated Jun. 29, 2017, 11 pgs.
Office Action for U.S. Appl. No. 13/267,665, dated Jul. 25, 2017, 26 pgs.

| | |
|---|---|
| FIG. 5A-1 | FIG. 5A-2 |
| FIG. 5A-3 | FIG. 5A-4 |
| FIG. 5A-5 | FIG. 5A-6 |

*FIG. 5A*

Nodes — 502

|  | | |
|---|---|---|
| 🔑 | id | LONG INTEGER | NOT NULL |
|  | created_at | TIMESTAMP | NULL |
|  | updated_at | TIMESTAMP | NULL |
| X2 | path | VARIABLE CHARACTER (255) | NOT NULL |
| X1 | name | VARIABLE CHARACTER (255) | NOT NULL |
|  | deleted | BOOLEAN | NULL |
| FK2 | dtfs_user_id | LONG INTEGER | NOT NULL |
|  | user_permissions | SMALL INTEGER | NOT NULL |
| FK1 | dtfs_group_id | LONG INTEGER | NOT NULL |
|  | group_permissions | SMALL INTEGER | NOT NULL |
|  | world_permissions | SMALL INTEGER | NOT NULL |
|  | original_size | LONG INTEGER | NOT NULL |
|  | last_access_time | TIMESTAMP | NOT NULL |
|  | last_modification_time | TIMESTAMP | NOT NULL |
|  | last_status_change | TIMESTAMP | NOT NULL |
|  | hash_code | INTEGER | NOT NULL |
|  | hash_algorithm | VARIABLE CHARACTER | NOT NULL |
|  | stub_hash_code | INTEGER | NOT NULL |
|  | stub_hash_algorithm | VARIABLE CHARACTER | NOT NULL |
|  | compressed_algorithm | VARIABLE CHARACTER | NOT NULL |
|  | original_write_time | VARIABLE CHARACTER | NOT NULL |
| X1 X3 | parent_node_id | LONG INTEGER | NULL |
| 🔑 | Primary Key (id) | | |
| FK1 | Foreign Key (dtfs_group_id) | | |
| FK2 | Foreign Key (dtfs_user_id) | | |
| X1 | name_parent_id_uk (name, parent_node_id) | | UNIQUE |
| X2 | path_idx (path) | | NOT UNIQUE |
| X3 | parent_node_idx (parent_node_id) | | NOT UNIQUE |

TO FIG. 5A-2
FROM FIG. 5A-3

DTFS_Settings

|  | | | |
|---|---|---|---|
| 🔑 | id | LONG INTEGER | NOT NULL |
|  | created_at | TIMESTAMP | NULL |
|  | updated_at | TIMESTAMP | NULL |
| X1 | name | VARIABLE CHARACTER | NOT NULL |
|  | value | VARIABLE CHARACTER | NOT NULL |
| 🔑 | Primary Key (id) | | |
| X1 | name_uk (name) UNIQUE | | |

516

Tape_Drives — 522

| | LONG INTEGER | NOT NULL |
|---|---|---|
| 🔑 id | | |
| created_at | TIMESTAMP | NULL |
| updated_at | TIMESTAMP | NULL |
| X1 element_id | INTEGER | NOT NULL |
| X2 serial_number | VARIABLE CHARACTER | NOT NULL |
| X2 vendor | VARIABLE CHARACTER | NOT NULL |
| last_cleaning_time | TIMESTAMP | NULL |
| description | VARIABLE CHARACTER | NULL |

🔑 Primary Key (id)

X1 drive_uk (element_id) UNIQUE
X2 serial_number_uk (serial_number, vendor) UNIQUE
X3 tape_idx () NOT UNIQUE

FROM FIG. 5A-3

*FIG. 5A-4*

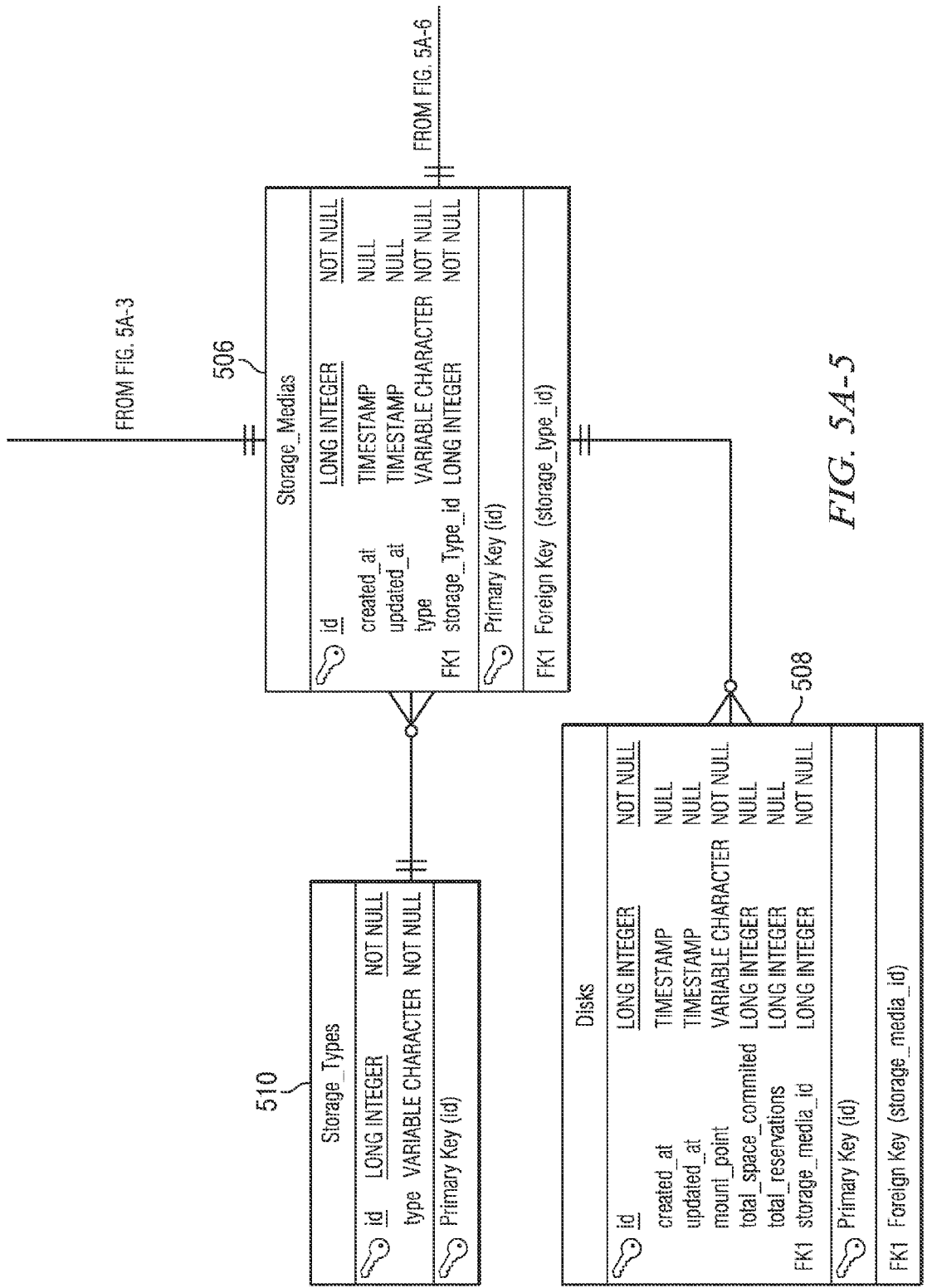

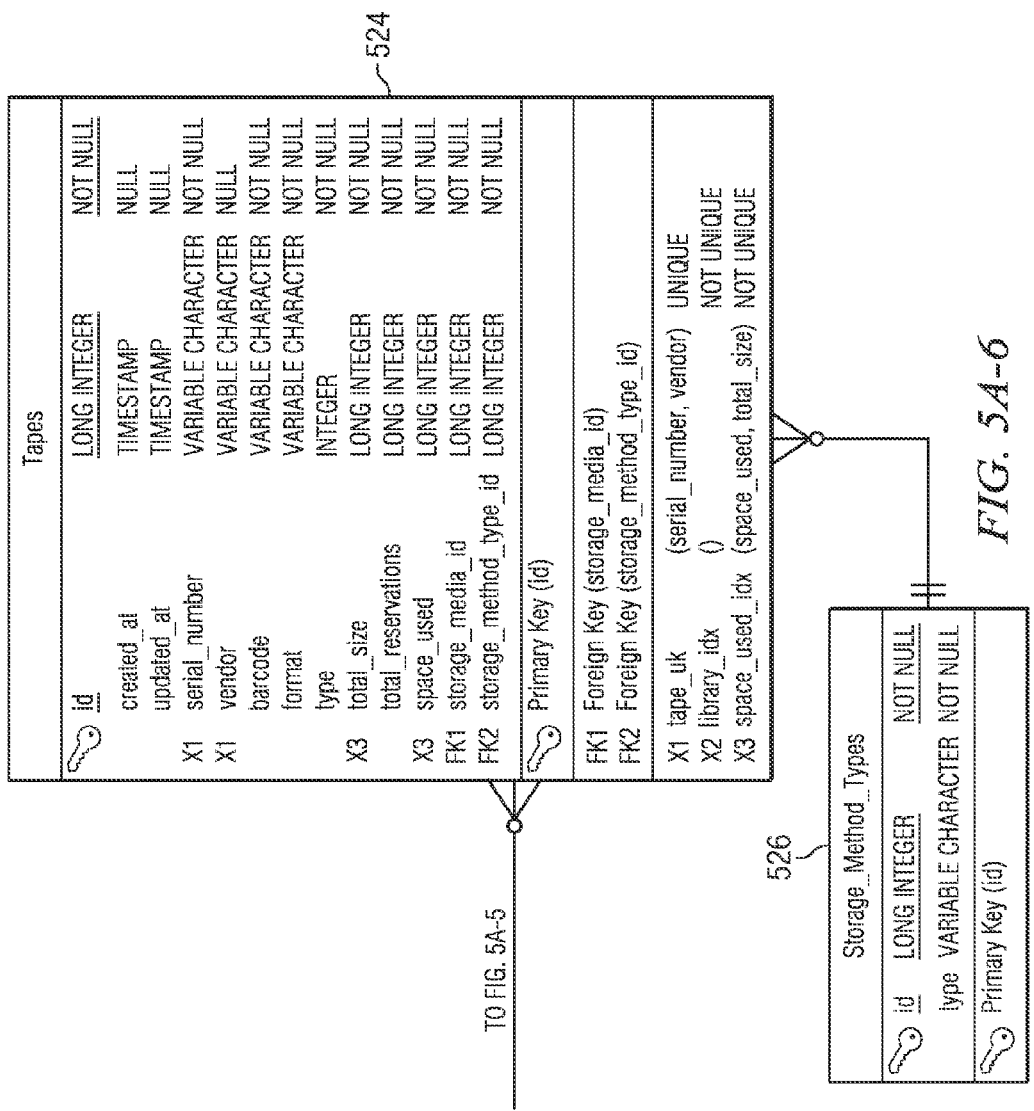

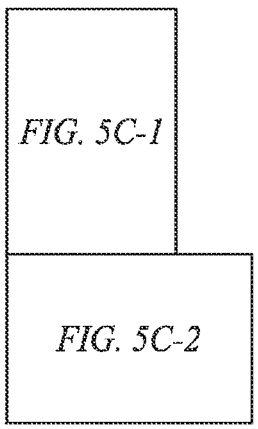

| | Nodes | | |
|---|---|---|---|
| 🔑 | id | LONG INTEGER | NOT NULL |
| | created_at | TIMESTAMP | NULL |
| | updated_at | TIMESTAMP | NULL |
| X2 | path | VARIABLE CHARACTER (255) | NOT NULL |
| X1 | name | VARIABLE CHARACTER (255) | NOT NULL |
| | deleted | BOOLEAN | NULL |
| FK2 | dtfs_user_id | LONG INTEGER | NOT NULL |
| | user_permissions | SMALL INTEGER | NOT NULL |
| FK1 | dtfs_group_id | LONG INTEGER | NOT NULL |
| | group_permissions | SMALL INTEGER | NOT NULL |
| | world_permissions | SMALL INTEGER | NOT NULL |
| | original_size | LONG INTEGER | NOT NULL |
| | last_access_time | TIMESTAMP | NOT NULL |
| | last_modification_time | TIMESTAMP | NOT NULL |
| | last_status_change | TIMESTAMP | NOT NULL |
| | hash_code | INTEGER | NOT NULL |
| | hash_algorithm | VARIABLE CHARACTER | NOT NULL |
| | compressed_algorithm | VARIABLE CHARACTER | NOT NULL |
| | original_write_drive | VARIABLE CHARACTER | NOT NULL |
| X1 X3 | parent_node_id | LONG INTEGER | NULL |
| 🔑 Primary Key (id) | | | |
| FK1 Foreign Key (dtfs_group_id) | | | |
| FK2 Foreign Key (dtfs_user_id) | | | |
| X1 name_parent_id_uk (name, parent_node_id) UNIQUE | | | |
| X2 path_idx (path) NOT UNIQUE | | | |
| X3 parent_node_idx (parent_node_id) NOT UNIQUE | | | |

FROM FIG. 5C-2

SYSTEM, METHOD AND COMPUTER PROGRAM PRODUCT FOR RECOVERING STUB FILES

RELATED APPLICATIONS

This application is a continuation of, and claims a benefit of priority under 35 U.S.C. 120 of the filing date of U.S. patent application Ser. No. 13/485,060, filed on May 31, 2012, entitled "System, Method and Computer Program Product For Recovering Stub Files", the entire contents of which are hereby expressly incorporated by reference for all purposes.

TECHNICAL FIELD

This disclosure relates to recovering stub files. Even more particularly, this disclosure relates to recovering stub files used to respond to requests for file data while a tape is loaded.

BACKGROUND

Businesses, governmental organizations and other entities are increasingly saving large volumes of data necessary for daily operations. This data represents a significant asset for these entities. Consequently, data loss, whether accidental or caused by malicious activity, can be costly in terms of wasted manpower, loss of goodwill from customers, loss of time and potential legal liability. To ensure proper protection of data for business and legal purposes (e.g., to ensure quick recovery of data in the event of a disaster, to comply with document retention requirements, etc.), these entities often back up data to a physical media, such as magnetic tapes or optical disks on a regular basis.

Traditional backup systems placed an application server, backup server, source device, destination device and a local area network ("LAN") in the data path of backup operations. Under these systems, the LANs were becoming overburdened by the amount of data being copied. Often, the backup window (the period in which data unavailable for normal operations in order to permit backup) was too short to achieve a complete backup of data. Accordingly, many entities implemented Storage Area Networks ("SAN") to relieve the burden of mass data storage and backup from the LAN, freeing the LAN for more immediate data storage and manipulation operations. In SANs data from multiple machines on a network may be backed up to a remote media library. Centralized data backup allows storage problems to be identified at one location and has the advantage of increased efficiency.

One example of a media library commonly used in enterprise backup systems is a magnetic tape library. In a typical magnetic tape library, tapes are contained in cartridges and the tape library contains multiple cartridge slots in which tape cartridges can be stored. The tape cartridges are physically moved between cartridge slots and tape drives by a robot. The robot is controlled by access commands received from the host devices on the network. When specific data is required, the host device determines which cartridge slot contains the tape cartridge that holds the desired data. The host device then transmits a move-element command to the robot and the robot moves the tape cartridge.

Recently, the Linear or Long Term File System (LTFS) Format Specification by IBM and Ultrium (hereby fully incorporated by reference in its entirety for all purposes) has been developed, which defines a file system for LTO-5 tapes, LTO-6 tapes and may be extended to other tapes using an eXtensible Markup Language (XML) schema architecture. This file system support allows the use of an LTFS-formatted tape as if it were a file system. Files and directories may appear in a directory listing, files may be dragged and dropped from tape, data may be accessed at the file level, etc.

SUMMARY

Embodiments described herein provide systems and methods for recovering a read cache. One embodiment of a system for recovering a read cache can include an archive node appliance. The archive node appliance can comprise a processor, a data store and a computer readable medium storing a set of computer executable instructions executable on the processor. The instructions can be executable to maintain a read cache, receive a request from a network file system interface client for a first file at a first location, locate the first file at a second location on a media of a media library, read the first file from the media of the media library and populate the read cache with a stub file for the first file using file data read from the media.

Another embodiment can include a computer program product comprising a non-transitory computer readable medium storing a set of computer executable instructions. The computer instructions can be executable to perform a method comprising: maintaining a read cache, receiving a request from a network file system interface client for a first file at a first location, locating the first file at a second location on a media of a media library, reading the first file from the media of the media library and populating the read cache with a stub file for the first file using file data read from the media.

Yet another embodiment can include a method for recovering a read cache comprising: maintaining a read cache comprising portions of files stored on media of a media library, receiving a request from a network file system interface client for a first file at a first location, locating the first file at a second location on a media of the media library, wherein the second location mirrors the first location, reading the first file from the media of the media library and populating the read cache with a stub file for the first file from file data read from the media.

BRIEF DESCRIPTION OF THE DRAWINGS

The drawings accompanying and forming part of this specification are included to depict certain aspects of the systems and methods. A clearer impression of the components and operation of systems provided will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Figure 1:
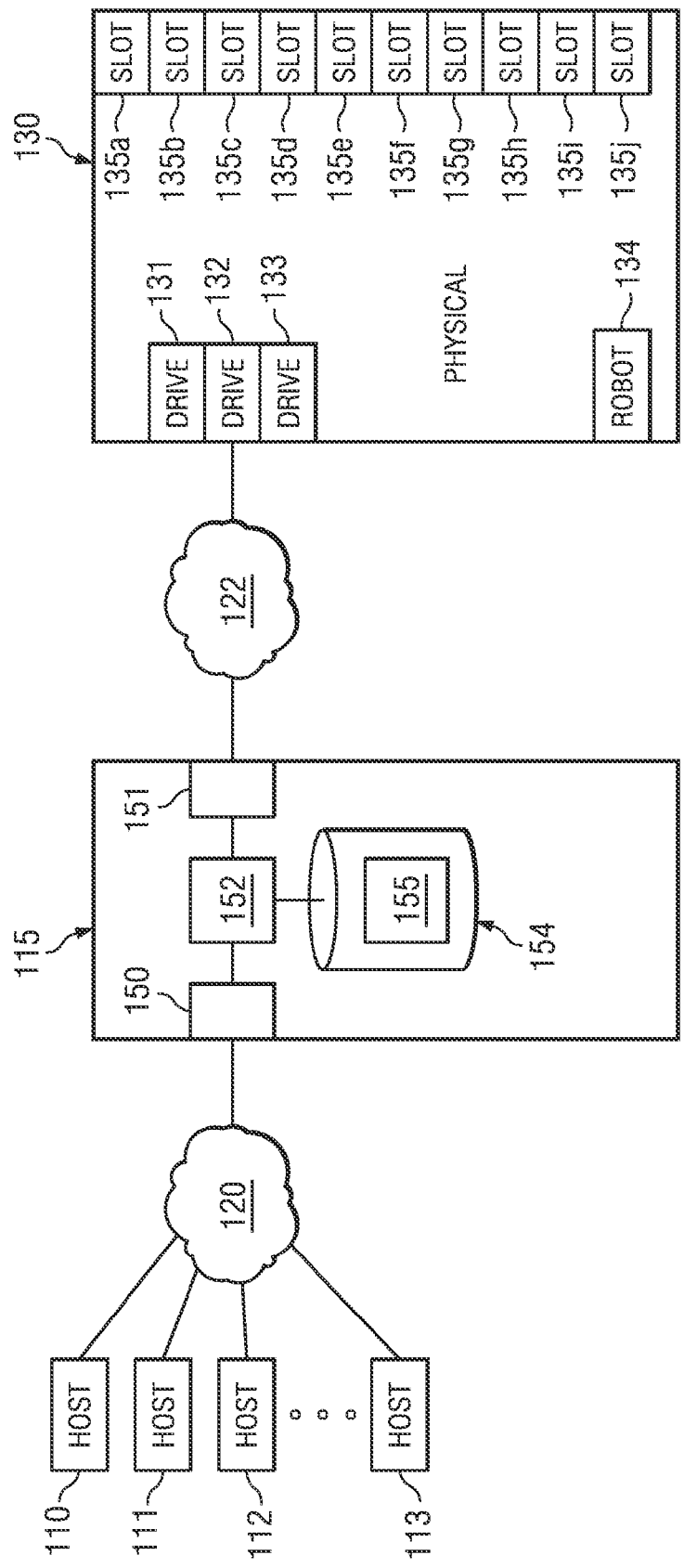
FIG. 1 is a diagrammatic representation of one embodiment of system comprising an Archive Node Appliance.

The systems and methods and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the description in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk drive, flash drive or other memory), hardware circuitry or the like, or any combination.

Before discussing specific embodiments, embodiments of a hardware architecture for implementing certain embodiments is described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylus, etc.) or the like. In various embodiments, the computer has access to at least one database.

ROM, RAM, and HD are computer memories for storing data and computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of compiled C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations include, but is not limited to: "for example," "for instance," "e.g.," "in one embodiment."

It may be desirable to provide a file system utilizing media libraries. To that end, attention is now directed to systems and methods for implementing a file system utilizing a tape library. In particular, embodiments may present a network file system interface to one or more host devices. These host devices may utilize the network based file system to organize, store, read or perform other operations in association with files. These files may be managed in conjunction with a tape library. Specifically, commands in a network file system protocol may be received. These commands may be associated with operations to be performed on files, including operations associated with the organization, storage or retrieval of those files. Library control functionality that allows tapes in the tape library to be tracked and tapes to be moved into and out of drives and storage slots is utilized to manage the tape library.

In certain embodiments, LTFS (including Library LTFS) may be employed in conjunction with the tape library such that the tapes in the tape library may be formatted using LTFS. Accordingly, operations with respect to the files on the tapes in the tape library may be performed using LTFS. A mapping may be maintained between the files visible through the networked based file system presented to the host devices and the corresponding location of those files on an LTFS tape in the tape library or other location. It should be noted here that while embodiments as discussed include a tape library having tapes formatted according to LTFS, other types of media libraries that utilize media of the same or different type where the media may be formatted according to the same or another type of file system may be employed in other embodiments.

To increase performance, embodiments of such a system may include a data store, which may be on a storage medium that is relatively faster for random accesses such as a disk. Files that are stored by the host devices using the networked based file system may initially be stored on the disk. These files are subsequently migrated to tapes in the tape library. Once a file has been stored on tape, a stub file that contains a portion of the file may remain on the data store, with the remainder of the file being deleted from the data store. When the file is subsequently accessed, the initial requests for file data can be serviced using data from the stub file while the tape containing the full file loads. The use of a stub file allows time for the tape to load and file data to be read from the tape, reducing or preventing timeouts.

In some cases, previously stored stub files may be deleted, become corrupted or otherwise become unusable. Therefore, it may be desirable to implement a stub file recovery scheme. According to one embodiment, ad hoc stub file recovery can be implemented in which individual stub files are recovered as needed. If a stub file is missing, corrupted or otherwise unusable, the stub file can be repopulated when a corresponding file is requested.

FIG. 1 is a diagrammatic representation of a system in which a media library is managed to present a network based file system to a plurality of hosts (i.e., host devices). Archive Node Appliance 115 can comprise one or more communications interfaces 150, 151 (e.g., fibre channel interface, Ethernet port or any other type of communication interface known in the art) to connect Archive Node Appliance 115 to network 120 and network 122. In this embodiment, hosts 110, 111, 112 and 113 are coupled to an Archive Node Appliance 115 via network 120. Network 120 can comprise the Internet, a LAN, a WAN, a SAN, a wireless network, or any other communications link, network or protocol known in the art. For example, network may comprise an Ethernet based network employing TCP/IP.

Archive Node Appliance 115 is coupled to media library 130 via network 122 (Archive Node Appliance 115 and media library 130 may be collectively referred to as an Archive Node or a Networked Attached Tape Archive (NATA)). Network 122 can comprise the Internet, a LAN, a WAN, a SAN, a wireless network, or any other communications link, network or protocol known in the art. For example, network 122 may comprise a fibre channel network (such as a fibre channel SAN) or a SCSI bus, such as a Serial Attached SCSI (SAS) bus. While Archive Node Appliance 115 has been depicted as a standalone device in this embodiment, it should be understood that Archive Node Appliance 115 can be implemented in a variety manners and in a variety of architectures. For example, when implemented in a SAN, the Archive Node Appliance may be part of a router, part of a media library or at any other location in a communication path between hosts and a media library.

Media library 130 may comprise a tape library or another media library known in the art such as optical jukeboxes. A tape library, as would be understood by one of ordinary skill in the art, typically consists of one or more tape drives that can read/write data from/to magnetic tape (contained within cartridges also referred to herein as tapes or tape cartridges), eject tape cartridges and perform other operations. A series of slots stores the tape cartridges when they are not in a drive and a robot moves the magnetic tape cartridges between the drives and slots.

As an example, media library 130 can comprise drives 131-133, robot 134 and slots 135 (individually slots 135a-j). It should be noted that a media library that employs a single robot or multiple robots in an expandable or modular configuration, but presents itself as a single media library to a network, or any other configuration of one or more media libraries, either physical or virtual, that can present itself as a single media library can be considered a single media library for the purposes of this application. It will also be noted that though the embodiment depicts only a single media library, other embodiments may be coupled to, and utilize, multiple media libraries.

Archive Node Appliance 115 comprises a computer processor 152 and a computer readable memory 154 (e.g., RAM, ROM, magnetic disk, optical disk and/or any other computer readable memory known in the art) that can store computer instructions 155 that are executable by processor 152. Computer instructions 155 can be implemented as hardware, software, firmware, some combination or in any other suitable manner as would be understood by those of ordinary skill in the art.

In operation, computer instructions 155 can be executable such that Archive Node Appliance 115 can present a network based file system (i.e., a file system accessible over a network) to hosts 110, 111, 112, 113, allowing these hosts to organize, store or retrieve files or perform other operations associated with a file system. Operations that can be performed using such network based files systems are understood by those of skill in the art. This network based file system may be for example, a Network File System (NFS) based file system, a Common Internet File System (CIFS) based file system, a File Transfer Protocol (FTP) based file system, a Secure Copy Protocol (SCP) based file system, a Representational State Transfer (REST) based file system, or a file system based on any another type of protocol which allows a file system to be accessed over a network.

Computer instructions 155 may thus be executable to implement operations associated with the presented network based file system in conjunction with media library 130. More specifically, in one embodiment, drives 131, 132, 133 may be LTO-5, LTO-6 compliant drives and tapes in media library 130 may be formatted according to LTFS (as disclosed in the Linear Tape File System Format Specification Version 2.0, or other version by IBM, hereby incorporated by reference in its entirety). In other embodiments the drives may be compliant with other types of tapes and the tapes may be formatted according to other tape file systems. Computer instructions 155 may be executable to store files received through the networked based file system on the LTFS tapes in the media library 130 and maintain mapping information between the files visible through the network based file system and the location of those files in the media library.

The files visible through the network based file system can be files stored at an intermediate location (e.g., a disk based data store or memory). When a file visible through the network based file system is accessed, computer instructions 155 can be executed to provide access to the file from the intermediate location. File operations can thus occur on the file at the intermediate location rather than directly on the file on the tape.

In some cases, the file may not reside or reside entirely in the intermediate storage when the file is accessed. Therefore, the computer instructions 155 can also be executable to determine the location of the accessed file in the media library 130 using the mapping information, locate and load the correct tape into a drive, and use LTFS to mount the LTFS file system on the tape and access the file to, for example, read the remainder of the file into the intermediate storage.

To increase performance, in some embodiments, it may be desired to store files on computer readable memory 154 when they are initially received, and migrate these files to the media library 130 at a later point. Computer instructions 155 may therefore be executable to store files stored by hosts using the network based file system to the computer readable memory 154. At some later point, the computer executable instructions 155 may be executable to migrate the file from the computer readable memory 154 to the media library 130. In this case, computer executable instructions 155 are executable to maintain mapping information between the files visible through the network based file system and the location of those files on the computer readable memory 154 or the media library 130.

The use of LTFS in conjunction with the media library 130 can afford a number of advantages when employed by an Archive Node Appliance 115 to implement a networked based file system. One important advantage is that the file system structure presented through the file system may be substantially mirrored on the tapes of the media library 130. Accordingly, if there is a failure of the Archive Node Appliance 115 or media library 130, the files on the tapes of the media library 130 may be easily located, as they are stored according to a structure that is substantially identical to that defined by the users at the hosts using the network based file system.

Furthermore, the use of LTFS means that tapes on which files of the network based file system are stored may be mounted and the file system on these tapes accessed, using any computing device which supports LTFS. As LTFS is commonly provided for many of today's operating systems, these tapes (and files stored thereon) may be easily accessed, allowing files to be restored or otherwise manipulated without requiring specialized software.

To put a finer point on some of the advantages offered by embodiments disclosed herein, the functionality and performance of a network based file system may be achieved while simultaneously achieving the benefits of storage on a medium typically used for backup without the need for any type of specific backup application. The use of an Archive Node Appliance may abstract the media library to implement a network based file system and hide the corresponding complexity entailed by the use of such a media library. By using a computer readable memory which is relatively faster for random accesses such as a disk in conjunction with the media library to provide the network based file system the Archive Node Appliance may provide the speed customarily associated with a network based file system by masking the latency of the use of the media library. Simultaneously, the use of such a media library provides the benefit of having files automatically stored on a storage media typically used for backup without specific action by users or the use of a backup application.

Furthermore, the use of LTFS in conjunction with the media library allows the file system created by users using the network based file system to be mirrored on the storage media. Thus, when restoring files from the storage media of the media library in the event of a failure, no specialized structural knowledge is required. The files on the storage media are in the locations where they were placed by the users in conjunction with the network based file system. Moreover, since LTFS is commonly supported data on the storage media may be easily accessed without the need for specialized software such as a backup application.

Figure 2:
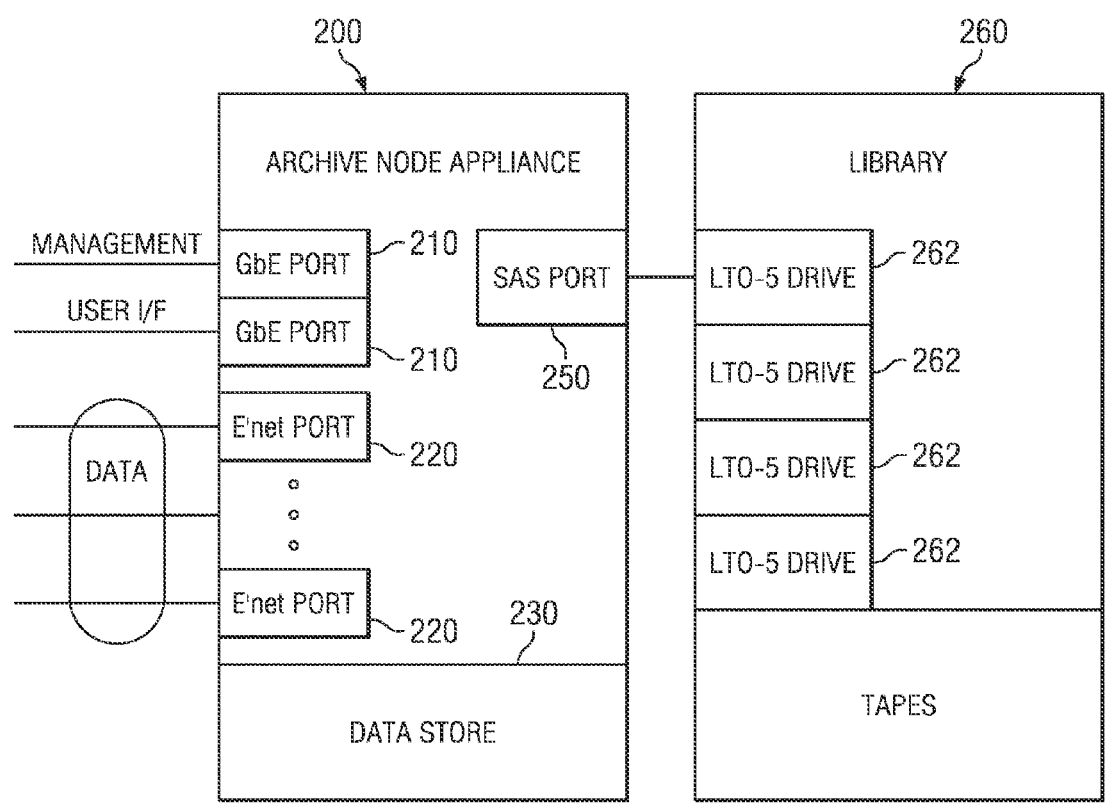
FIG. 2 is a diagrammatic representation of one embodiment of an Archive Node Appliance.

It may be helpful here to illustrate architectures for certain embodiments of an Archive Node. FIG. 2 depicts one embodiment of an architecture for an Archive Node that may be used in instances where relatively lower capacity is desired. Here, the Archive Node Appliance 200 may comprise one or more Gigabit Ethernet ports 210. These Gigabit Ethernet ports 210 may be dedicated to providing a user interface or for a systems management interface such as the Intelligent Management Platform Interface (IPMI). The Archive Node Appliance 200 may also comprise one or more Ethernet ports 220 for data connections. These Ethernet ports may be 10BASE-T, 100BASE-TX, 1000BASE-T, 10GBASE-LR, 10GBASE-LW, 10GBASE-LRM, 10GBASE-ZR, 10GBASE-LX4, 10BASE-CX4, etc. or may be of a mixture of types. In operation these Ethernet ports 220 may be coupled to hosts, such that a network based file system may be provided by the Archive Node Appliance 200 and hosts may interface with the Archive Node Appliance 200 using these Ethernet ports 220 to utilize the network based file system, for example, by storing or retrieving files using the network based file system. The network based file system may be implemented using a file system implemented in association with user space such as the File system in User space (FUSE) file system; using a kernel-based file system such as Ext2, Ext3, Ext4 Next3, etc.; or almost any other type of file system desired.

Archive Node Appliance 200 also includes a data store 230. Data store 230 may be a computer readable memory used to store computer executable instruction, files stored using the network based file system or other data utilized by Archive Node Appliance 200, as will be elaborated on in more detail subsequently. To ensure some degree of redundancy or fault tolerance, data store 230 may implemented as Redundant Array of Independent Disks (RAID) storage having around 5 TB-8 TB of available storage. Archive Node Appliance 200 also comprises a SAS port 250 through which the Archive Node Appliance 200 is coupled to media library 260 via a SAS bus. Media library 260 may be an IBM TS3100 tape library having one or more LTO-5 compliant drives 262 and capable of holding 24 tape cartridges or an IBM TS3200 tape library having one or more LTO-5 compliant drives 262 capable of holding 48 tape cartridges. In other embodiments, the media library may include LTO-6 compliant drives or other types of drives.

While it should be noted that Archive Node Appliance 200 may be implemented in substantially in any form factor desired, in one embodiment Archive Node Appliance may be based on a rack-mount storage format and may, for example, be contained in a chassis of a 1U, 2U or 3U form factor with the data store residing internally to the chassis.

Figure 3:
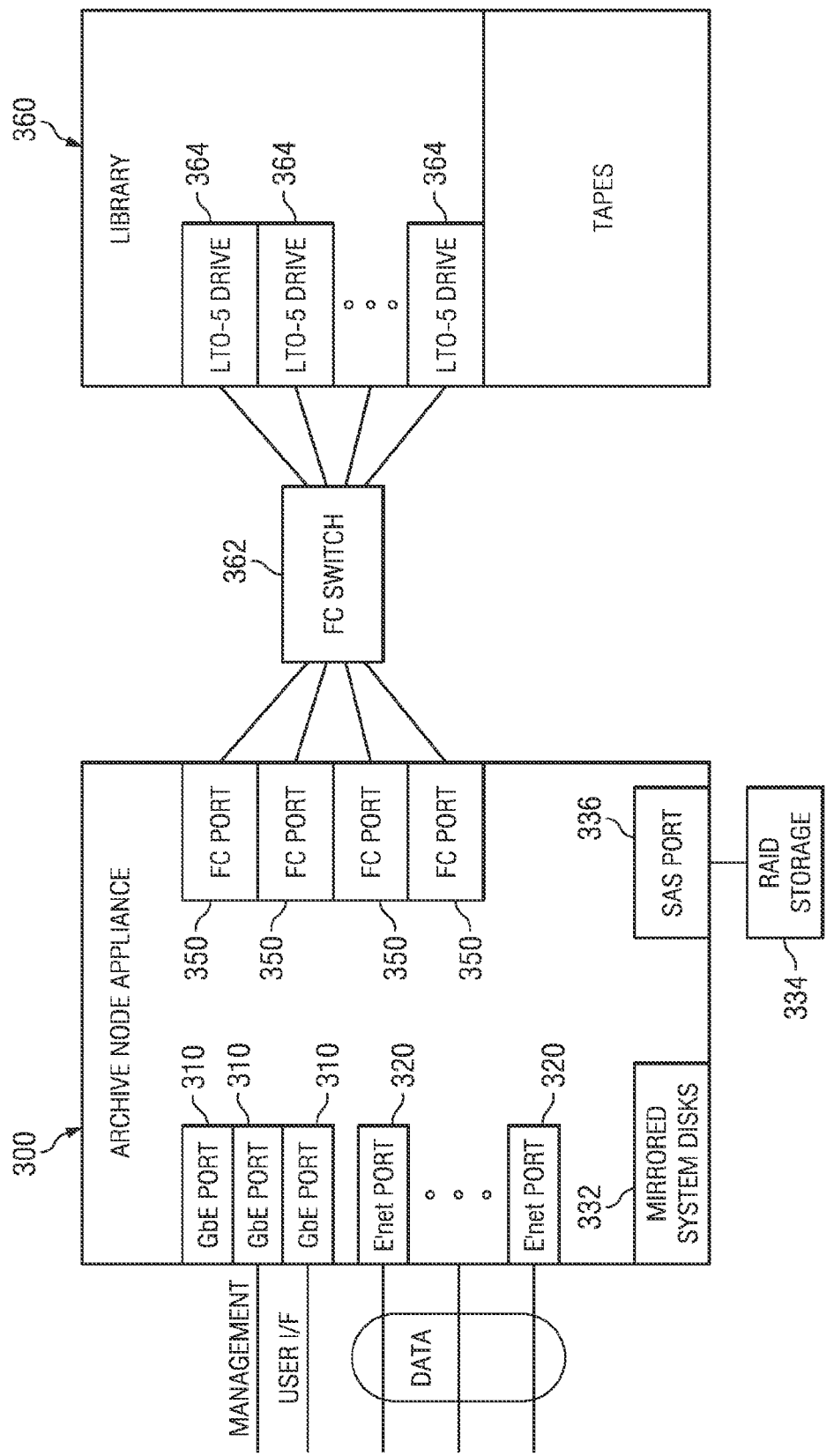
FIG. 3 is a diagrammatic representation of one embodiment of an Archive Node Appliance.

Moving on, FIG. 3 depicts one embodiment of an architecture for an Archive Node that may be used in instances where relatively greater storage capacity is required, such as in, for example, large data installations or a cloud storage provider. In this embodiment, the Archive Node Appliance 300 may comprise one or more Gigabit Ethernet ports 310. These Gigabit Ethernet ports 310 may be dedicated to providing a user interface or for a systems management interface. The Archive Node Appliance 300 may also comprise one or more Ethernet ports 320 for data connections. These Ethernet ports may be 10BASE-T, 100BASE-TX, 1000BASE-T, 10GBASE-LR, 10GBASE-LW, 10GBASE-LRM, 10GBASE-ZR, 10GBASE-LX4, 10BASE-CX4, etc. or may be of a mixture of types. In operation these Ethernet ports 320 may be coupled to hosts, such that a network based file system may be provided by the Archive Node Appliance 300 and hosts may interface with the Archive Node Appliance 300 using these Ethernet ports 320 to utilize the network based file system, for example, by storing or retrieving files using the network based file system. As noted above, the network based file system may be implemented using a file system implemented in association with user space such as the File system in User space (FUSE) file system; using a kernel-based file system such as Ext2, Ext3, Ext4 Next3, etc.; or almost any other type of file system desired. Archive Node Appliance 300 also includes a data store 334.

Data store 334 may be a computer readable memory used to store computer executable instructions, files stored using the network based file system or other data utilized by Archive Node Appliance 300. To ensure redundancy or fault tolerance, data store may comprise a mirrored system disk 332 comprising the computer executable instruction and other data utilized by the Archive Node Appliance 300 during operation and Redundant Array of Independent Disks (RAID) storage coupled to the Archive Node Appliance 300 through SAS port 336. The RAID storage may be used to store files associated with the network based file system and may have around 9 TB-150 TB of available storage. Archive Node Appliance 300 also comprises fibre channel ports 350 through which the Archive Node Appliance 300 is coupled to media library 360 via a fibre channel switch 362. These fibre channel ports 350 may be, for example, 16, 8, 4 or 2 GB fibre channel ports. Media library 360 may be an IBM TS3500 tape library having one or more LTO-5 compliant drives 364 and capable of holding around 20,000 tapes, a media library having one or more LTO-6 compliant drives or a media library supporting other types of tapes that can be formatted according to a tape file system.

Again, while it should be noted that Archive Node Appliance 300 may be implemented in substantially in any form factor desired, in one embodiment Archive Node Appliance 300 may be based on a rack-mount storage format and may for example, be contained in a chassis of a 1U, 2U or 3U form factor with the data store residing internally to the chassis or portions of the data store, such as the RAID storage residing external to the chassis.

Figure 4:
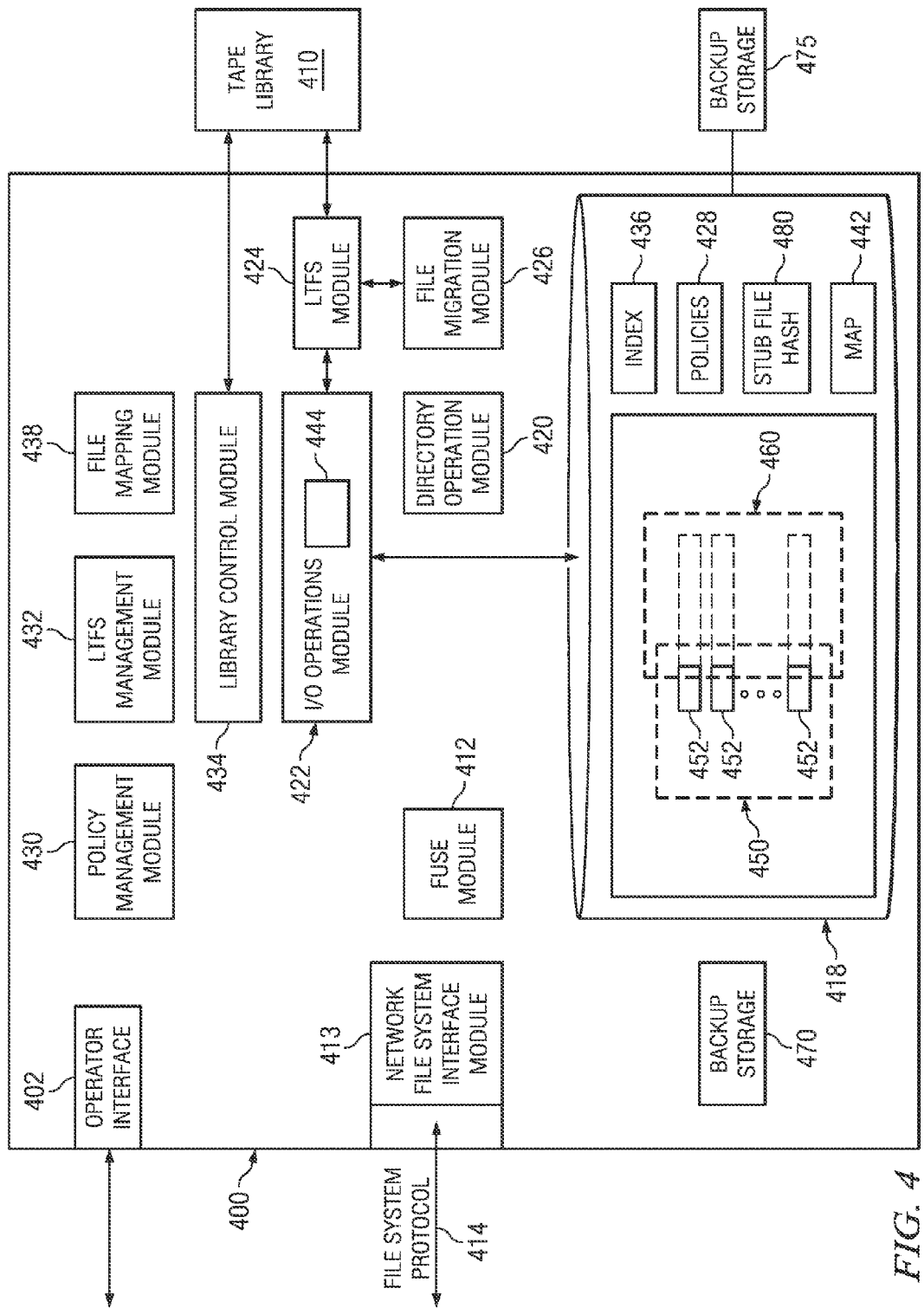
FIG. 4 is a diagrammatic representation of one embodiment of an Archive Node Appliance.

Turning now to FIG. 4, one embodiment of a functional architecture for an Archive Node is depicted. Archive Node Appliance 400 may provide an operator interface 402 through which the Archive Node Appliance 400 may be configured. Such an operator interface 402 may be provided, for example, using a network based interface such as a set of web pages or the like. Archive Node Appliance 400 is coupled to tape library 410, comprising a set of LTO-5, LTO-6 or other tape compliant drives some of which may be LTFS (or other tape file system) formatted tapes. In one embodiment, each tape in tape library 410 may be used to store data that is compressed, data that is encrypted, data that is both compressed and encrypted or data that is neither compressed nor encrypted.

Archive Node Appliance 400 comprises Filesystem in Userspace (FUSE) module 412 that may presents a file system to a local operating system. A network file system interface module 413 provides access to all or a portion of the FUSE file system as one or more shared volumes (e.g., as a hierarchical file system with directories, etc.) that can be accessed using an interface that operates according to network file system protocol 414 such as NFS, CIFS, FTP, REST etc. Data associated with the shared volumes is stored on one or more partitions of data store 418 (a computer readable memory), where the structure of the partitions of the data store 418 may, or may not, correspond to the structure of the shared volumes or to the structure of the file system presented by FUSE module 412.

Directory operations module 420 is configured to process any directory operations that are received by FUSE module 412. I/O operations module 422 is configured to process any input or output operations involved with the reading or the storing of files associated with the file system presented by the FUSE module 412. These operations include, for example, the writing of files to the data store 418, the reading of files from the data store 418, the deletion of files from the data store 418, the reading of files from a tape in the tape library 410 or other operations associated with the data store 418 or tape library 410.

These I/O operations may involve the use of library control module 434, LTFS module 424, LTFS management module 432 and index 436. The location of each tape within the tape library 410 may be maintained in index 436 (e.g., in which slot or drive each tape is located, in which library the tape is located if multiple tape libraries are in use, etc.). Additionally, in one embodiment, what type of data is stored on each tape (encrypted, compressed, neither encrypted nor compressed, etc.) may also be maintained.

Library control module 434 is configured to control the movement of the tapes in the tape library 410, including ejecting the tapes from the drives of the tape library 410, and the movement of tapes to and from slots of the tape library 410 and in and out of drives of the tape library using the robot. LTFS management module 432 is configured to mount or unmount the LTFS file system on a particular tape in a drive of the tape library 410. LTFS module 424 is configured to perform LTFS operations with respect to an LTFS mounted file system.

Library control module 434, LTFS module 424, LTFS management module 432 and index 436 may also be utilized by file migration module 426. File migration module 426 is configured to move files from data store 418 to tape library 410 based on policies 428. File mapping module 438 maintains map 442 which correlates a file visible through the FUSE file system to its corresponding location in the tape library 410. Specifically, a mapping between the location (for example the path) and name of the file with respect to the FUSE file system, the name and location of that file in the data store 418 and the name and location of that file on one or more tapes in the tape library 410 may be maintained in map 442.

Policies 428 may, or may not be, user configured and may be associated with storage of the files or the migration of files from the data store 418 to tapes in the tape library 410. Such policies may specify, for example, how long to wait before migrating a file (referred to herein as a migration timeout period), whether the files are to be replicated when migrated (e.g., stored in conjunction with multiple Archive Nodes as will be elaborated on in more detail), how many copies of the file to keep, where the multiple copies are to be kept on different tapes, whether the file is to be encrypted or compressed, etc. The policies 428 may be defined with respect to the directories presented with respect to the FUSE module 412 such that those policies may be defined with respect to all files within that directory. Policy management module 430 allows these policies to be managed (e.g., created, updated, defined, deleted, modified, etc.) by a user or otherwise. Policies can be defined at any level of the directory structure provided by FUSE module 412. Because a directory presented by FUSE module 412 may be presented as a shared volume by network file system interface module 413, a policy that applies to the directory may also apply to the share.

In operation then, Archive Node Appliance 400 may present a network based file system accessible through an interface, where the files associated with the network based file system may be stored on the tape library 410 according to a file system structure that substantially mirrors the file system structure of the presented network based file system. In one embodiment, mirroring the file system structure of the presented network based file system means that at least a portion of the path of the location of the file as it is stored on the tape library 410 may be substantially similar to the path of the location of the file as it is presented through the file system.

More specifically, users at host devices coupled to the Archive Node Appliance 400 may perform directory operations and store or read files using an interface for the network based file system provided by the Archive Node Appliance 400. In accordance with these user initiated operations, commands in the network file system protocol 414 employed by the interface may be received at the Archive Node Appliance 400 and implemented by FUSE module 412 with respect to the partitions of data store 418. If the command is associated with a directory operation it may be processed by directory operations module 420. If the command is for the storing of a file, the I/O operations module 422 may write this file to a location in the data store 418. Map 442 may be updated to comprise a mapping between the location and name of the file with respect to the FUSE file system and the name and location of that file in the data store 418.

In one embodiment, the file is stored in the data store 418 according to the one or more policies that apply to that file. For example, if a policy that applies to the file specifies that the file should be compressed the file may be compressed before the file is stored in the data store 418. Similarly, if an applicable policy specifies that the file is to be encrypted the file may be encrypted before it is stored in the data store 418. In certain embodiments, a self-encrypting disk, full disk encryption or a RAID controller which performs encryption may be utilized in conjunction with data store 418, such that all files stored in the data store 418 may be encrypted by the disk or controller when the file is stored to the data store 418. In such cases, all files stored to the data store 418 may be encrypted when stored to data store 418 and decrypted when read from data store 418.

Based on one or more of the policies 428, at some later point a file may be migrated to the tape library 410. As policies 428 may be defined based on a location associated with the presented file system, policies associated with the location (e.g., directory, share, etc.) where the file is stored may be determined from policies 428 and the determined policies applied to migrate the file.

As the file may be received over a network, errors may occur during the transmission of the file or the storage of the file to the data store. To account for network errors or the like, in one embodiment, a time period referred to as the migration timeout period is utilized. More specifically, when a file is first stored to the data store an amount of time equal to the migration timeout period may be allowed to elapse before the file is migrated. As discussed above, such a migration timeout period may be implemented as a policy. Thus, for example, a policy defining such a migration timeout period may be associated with a share or directory as visible through the network based file system implemented by the Archive Node Appliance.

In any event, once a file is selected for migration, the one or more policies 428 associated with that file may be utilized to migrate the file accordingly (e.g., encrypted, compressed, neither encrypted nor compressed, whether multiple copies of the file are to be maintained, if the file is to be replicated, etc.).

An appropriate tape on which to store the file may be determined and located using the index 436. If the appropriate tape is not currently in a drive of the tape library, library control module 434 may be utilized to load the appropriate tape into a drive of the tape library 410. More specifically, in most cases when an LTFS tape is formatted it is specified whether the data on that tape is to be compressed or not. Thus, the selection of an appropriate tape may include selecting a tape that is formatted according to a policy specified for the file being migrated (e.g., a tape formatted to hold compressed data may be selected if a policy specifies the file is to be compressed, etc.), selecting a tape that has a location associated with a location where the file is to be stored (e.g., a directory in the path of the location where the file is to be stored, etc.), etc. The selection of an appropriate tape may also involve other considerations not expressly enumerated.

The file system on the appropriate tape may be mounted using LTFS management module 432. File migration module 426 may use LTFS module 424 to copy the file from data store 418 to the appropriate tape at a location on the tape which corresponds to the location of the file as presented through the file system to the host devices coupled to the Archive Node Appliance. After the file is copied to the tape, all, or a portion of, the file may be deleted off of the data store. Accordingly, the migration may entail the creation of one or more directories on the mounted LTFS file system on the tape, where these directories may mirror the directories in the path where the file is stored that are visible to a user at a host device using the network based file system presented by the Archive Node Appliance 400. Additionally, when the file is copied to the mounted LTFS file system on the appropriate tape, actions may be taken to implement policies applicable to the file.

For example, if a policy that applies to the file specifies that the file should be compressed, the media drive can be instructed to compress the file. In one embodiment, the use of LTFS may simplify this compression. Specifically, if a file is to be compressed the selection of an appropriate tape formatted to store compressed data may indicate to the LTFS module 424 that data to be stored on the tape is to be compressed. The LTFS module 424 may configure the drive holding that tape to compress data such that when the file is stored to the tape using LTFS module 424 it is compressed as it is stored.

Similarly, if an applicable policy specifies that the file is to be encrypted, the drive can be instructed to encrypt the file. Encryption of the file being stored may be accomplished by the tape drive in which the appropriate tape is located. Specifically, before mounting the LTFS file system on the appropriate tape one or more commands (for example, SCSI or other types of commands that may or may not include key information to be utilized) may be sent to the drive to cause it to use encryption. The LTFS file system can then be mounted on the tape. LTFS can then be used to store the file on the tape while the tape drive handles the encryption of the data transparently to LTFS.

Other embodiments may accomplish compression or encryption of the files in different manners. For example, in one embodiment, to speed the migration of files, Archive Node Appliance may provide hardware support for such encryption or compression. Embodiments of methods and systems for such encryption or compression are discussed in U.S. patent application Ser. No. 12/025,181, entitled "System and Method For Enabling Encryption", filed on Feb. 4, 2008, which is hereby incorporated by reference for all purposes.

Additionally, if a policy 428 associated with the file specifies that multiple copies of a file are to be maintained a second tape on which to store the file may be determined and the file migration module 426 may use LTFS module 424 to copy the file from data store 418 to the second tape at a location on the second tape which corresponds to the location of the file as presented through the FUSE file system. Notice here that two separate tapes may have the file stored using an LTFS file system path that mirrors the path of that file as presented through the FUSE file system. Furthermore, if a policy associated with the file specifies that the file is to be replicated the file may also be sent to another Archive Node Appliance.

When a command to read a file is received, map 442 may be consulted to determine the location of the file (e.g., whether it is located in data store 418, on a tape in the tape library 410 or both). If the requested file is completely on the data store 418, I/O operations module 422 may respond to the read of the file using the file as stored in the data store 418. If the file is on a tape (and not entirely in the data store 418), the tape on which the file is located may be determined using the map 442. The index 436 and the library control module 434 can then be utilized to determine if the tape is in a drive, and if not, to load the appropriate tape into a drive of the tape library 410. The file system on the tape may be mounted using LTFS management module 432. I/O operations module 422 can then use LTFS module 424 to access the file on the tape and respond to the read of the file.

It will be noted here that certain actions may be taken in association with the read file before the file is used to respond to the read. In particular, in certain embodiments, actions associated with one or more policies applicable to the file may be performed. For example, if a policy that applies to the file specifies that the file should be compressed, the file may be decompressed as the file is read from the tape and before the file is used to respond to the read of the file. In one embodiment, the use of LTFS may simplify this decompression. Specifically, the tape on which the file is stored may be formatted to store compressed data. The presence of this type of tape in the drive may indicate to the LTFS module 424 that data stored on the tape is compressed. The LTFS module 424 may thus configure the drive holding that tape such that when the file is read from the tape using LTFS module 424 it is decompressed.

Similarly, if an applicable policy specifies that the file is to be encrypted the file may be decrypted before the file is used to respond to the read of the file. As LTFS may not support encryption, in one embodiment, decryption of the file being stored may be accomplished by the tape drive in which the appropriate tape is located. Specifically, before mounting the LTFS file system on the tape on which the file is stored one or more commands (for example, SCSI or other types of commands that may or may not include key information to be utilized) may be sent to the drive to cause it to decrypt the file. The LTFS file system can then be mounted on the tape. LTFS can then be used to read the file while the tape drive handles the decryption of the data transparently to LTFS. The file is then used to respond to the read of the file.

In many cases, however, if the file is located on tape, it may take a relatively long amount of time to access the file. This situation may be exacerbated if, for example the file system on the tape is not currently mounted, the tape itself is not currently in a drive of the tape library, the tape is currently positioned at a location far away from the location where the file is located, etc. These conditions can result in an access time for a file on tape that is on the order of minutes.

Many network based file system protocols have timeout conditions. For example, in the CIFS protocol, an OPEN or a READ command must be responded to within 30 seconds or a timeout condition will occur. The timeout condition may be dependent on the type of network file systems used. In some cases, the timeout period is negotiated between a host and file system. Thus, the Archive Node Appliance 400 can be configured to negotiate the timeout time with hosts. The timeout time can be set in a configuration setting for Archive Node Appliance 400. As a result, the time period for responding to such a command may be less than that needed to access the file on the tape. In order to present network based file systems based on these types of protocols such conditions may need to be addressed.

To that end, in some embodiments, read cache 450 may be maintained on data store 418. Read cache 450 may comprise the first portion 452 of each file stored using the network based file system presented by the Archive Node Appliance 400. The portion of the file in read cache 450 acts as a "stub file," which can be presented by the FUSE file system for example as being the full file while some of the data of the corresponding full file is not in the data store but is stored on tape. When a file is read, then, if any portion of the file is to be read from tape the first portion 452 of the read file that is stored as the stub file may be used to respond to the read request, while the file on the tape is located and read substantially simultaneously. Since the first portion 452 of the file is stored in the read cache 450 on the data store 418 it can be accessed quickly enough that a timeout on commands can be avoided while the file on the tape is accessed. The remainder of the file can then be read from the tape and used to respond to the commands.

The size of the first portion 452 of each file may be user configurable, based on system parameters, or defined in some other manner. In one embodiment, the read cache size may be based on directories provided by the FUSE module 412 so that all the files within the directory are a particular size. If the directory is presented as a share, the policy thus applies to files within the share. In another embodiment, the size retained on read cache 450 may be dependent upon the size of blocks that may be read in a single operation via the network file system, the set time for a timeout and the time required to load, mount and position a tape with the requested file.

When a host device wishes to read a file it may send OPEN and READ commands to the Archive Node Appliance 400. I/O operations module 422 may determine if the requested file is completely in the data store 418 using map 442. If so, I/O operations module 422 may respond to the read of the file using the file in the data store 418.

If however, the file is only on a tape, the tape on which the file is located may be determined using the map 442. The I/O operations module 422 can then initiate the load and access of the file on the tape using the library control module 434 and the LTFS management module 432. I/O operations module 422 delays the response to the initial OPEN command for a time period less than the timeout associated with the received command. In some embodiments, this time period may be the longest time period that does not result in a timeout occurring (e.g., 20 seconds, 29 seconds, etc.).

The host device may subsequently send a READ command for a certain amount (e.g., 64K or a different amount) of the file to the Archive Node Appliance 400. I/O operations module 422 can delay the response to this READ command as long as possible without a timeout resulting (e.g., 20 second, 29 seconds, or other time period). After the delay, the I/O operation module 422 will respond to the command with the data requested from the stub file. The I/O operations module 422 may continue to delay responses to subsequent READ commands and utilize data from the read cache 450 to respond to the READ commands until data from the first portion 452 is exhausted or the LTFS file system on the appropriate tape is mounted and the file on the tape can be accessed using LTFS module. The I/O operations module may continue to delay responses and dynamically switch between delaying responses and not delaying responses as needed.

In addition to delaying responses, Archive Node Appliance 400 can return less data than requested by the host. For example, Archive Node Appliance 400 may return 1K instead of the requested 64K. Whether Archive Node Appliance 400 returns less data than the amount requested may depend on the network file system protocol, host operating system or other factors. Returning less data than requested provides the advantage that the read cache can be smaller.

When the appropriate tape is loaded, I/O operations module 422 may then use LTFS module 424 to access the file on the tape and respond to subsequent READ commands for the file. More specifically, in one embodiment I/O operations module 422 may utilize LTFS module 424 to access the file on the appropriate tape and read the file from the tape into buffer 444. Subsequent READ commands for the file may be responded to using the data in the buffer 444.

Furthermore, in some embodiments, in addition to reading the file into buffer 444 the file may also be read into a file cache 460 on the data store. File cache 460 may be an area on data store utilized for temporary storage of files and may be managed according to almost any cache management technique desired. In certain cases if a host does not request data of the file at a particular rate (e.g., does not issue READ commands frequently enough, or the READ commands do not request a certain amount of data, etc.), after a certain number of READ commands I/O operations module 422 may respond to subsequent READ commands for the file using data of the file from the file cache.

In certain embodiments the opposite may also occur. More specifically, in some instances the reading of file data to the file cache 460 in addition to reading the file into buffer 444 may slow the response to requests for data from the host. In this case, reading the file data into both buffer 444 and file cache may mean that data cannot be delivered at the rate the user is requesting the data or may otherwise slow the response to user requests. Here, the reading of the data of the file into the file cache 460 may be stopped before the entire file is in the file cache such that requests for the file may be serviced more quickly. Thus, the portion of the file that is in file cache 460 may comprise none, some, or all, of a file.

In one embodiment, the file may be stored in the file cache 460 by appending any portions of the file which are read from the tape to the first portion 452 of the file in the read cache 450 if such a first portion of the read file exists in read cache 450. Thus, if the first portion 452 exists in the read cache 450 when any portion of the file not comprised by first portion 452 in the read cache is read from the tape it may be appended to the first portion 452 already stored in the read cache 450. The entire file may be stored in the file cache 460 when the file is read. At a later point, if portions of the file are deleted from the file cache 460 the first portion 452 of the file may be left on the data store 418 such that the first portion 452 of the file is in read cache 450.

As discussed above, stub files in read cache 450 can be used to prevent time out errors. Read cache 450 can be populated when the files are stored to the media library. A network file system interface client may request to store a file (which may comprise multiple commands in a file system protocol), where the file may be associated with a name and a path as visible through the network based file system implemented by the Archive Node Appliance. The file can be stored on a location on data store 418 where the file may have a different name and be located at a path associated with the data store. When the file is written to a location on a tape, the file data other than the first portion 452 can be deleted from data store 418, leaving the stub file. The data in the read cache 450 may be stored in a manner corresponding to the format in which the file is stored on the tape. Thus, for example, if the file is compressed when it is migrated to tape, the read cache 450 may comprise the first portion 452 of the file in compressed format.

To ensure the integrity of stub files, hash codes for each stub file can be maintained (stub file hash codes 480) and backed up. In one embodiment, a hash code for a stub file is calculated and stored when a stub file is created. Each time a stub file is accessed, a hash code is generated for the stub file and the generated hash code compared to the stored hash code for the stub file. A difference between the hash codes may indicate corruption of the stub file that the RAID system is reading the wrong sector or is otherwise performing incorrectly and error processing can occur.

Stub files in read cache 450 may be deleted, become corrupted or otherwise become inaccessible. In a large scale fault, for example, the entire read cache 450 may be lost (e.g., due loss of a RAID set or other failure). Rather than restoring the entire read cache at once, which would require high resource utilization and a large backup capacity, read cache 450 may be repopulated as files are accessed by clients through the network file system interface.

Accordingly, when a file is read by a network file system interface client and the first portion 452 of the read file is not in read cache 450, the file may be read from tape and used to respond to the read. The file data read from tape may be used to repopulate the read cache 450 by storing the first portion 452 of the file into the read cache 450 at that time (embodiments of which will be discussed in more detail below). Furthermore, file data from the tape can be read into file cache 460 so that the entire file is on data store 418 as discussed above. Thus, at a later point, if portions of the file are deleted from file cache 460, the first portion 452 of the file may be left on the data store 418 such that the first portion 452 of the file is in read cache 450.

It may be useful to discuss embodiments of the storage of configuration such as mapping data, index data, policies, file meta-data, tape-library data, etc. that may be utilized by an Archive Node Appliance. Embodiments of such storage methods and formats may be used, for example, to store the map, index and policies as discussed above. Preferably, mapping data, index data, policies, file meta-data, tape-library data, etc. are stored on a separate physical storage media from read cache 450 so that if the storage media that stores read cache 450 becomes corrupted or inoperable, the mapping data, index data, policies, file meta-data, tape-library data, etc. are still available. Thus, for example, mapping data, index data, policies, file meta-data, tape-library data, etc. can be stored on separate RAID sets from read cache 450.

Furthermore, all or a portion of data store 418 may be backed up to internal backup storage 470 (e.g., an internal SSD) or external back up storage 475 (e.g., to network attached storage, a direct attached storage array or otherwise). In one embodiment, in order to reduce backup storage requirements read cache 450 is not backed up. In another embodiment, stub files from read cache 450 corresponding to the most frequently accessed files (or stub files for files meeting other criteria) can be backed up, while the remainder of read cache 450 is not.

FIGS. 5A-5D depict one embodiment of a schema for a database that may be utilized in conjunction with embodiment of an Archive Node for mapping data, index data, policies, file meta-data, tape-library data, etc. All or a portion of the database can be backed up to external or internal backup storage to facilitate recovery.

Figures 2, 5A:
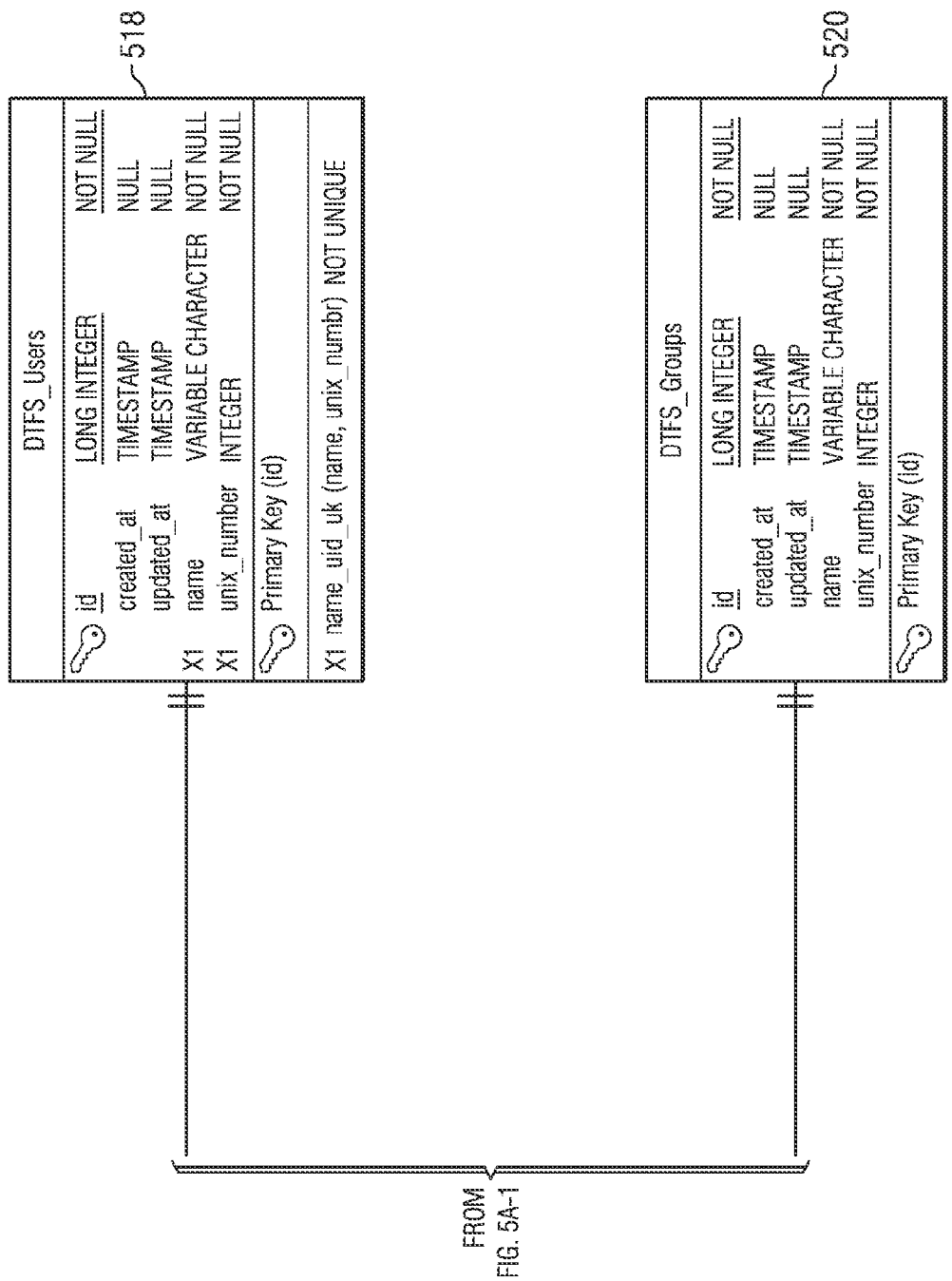
FIGS. 5A-5D are diagrammatic representations of one embodiment of a schema.
Figures 3, 5A:
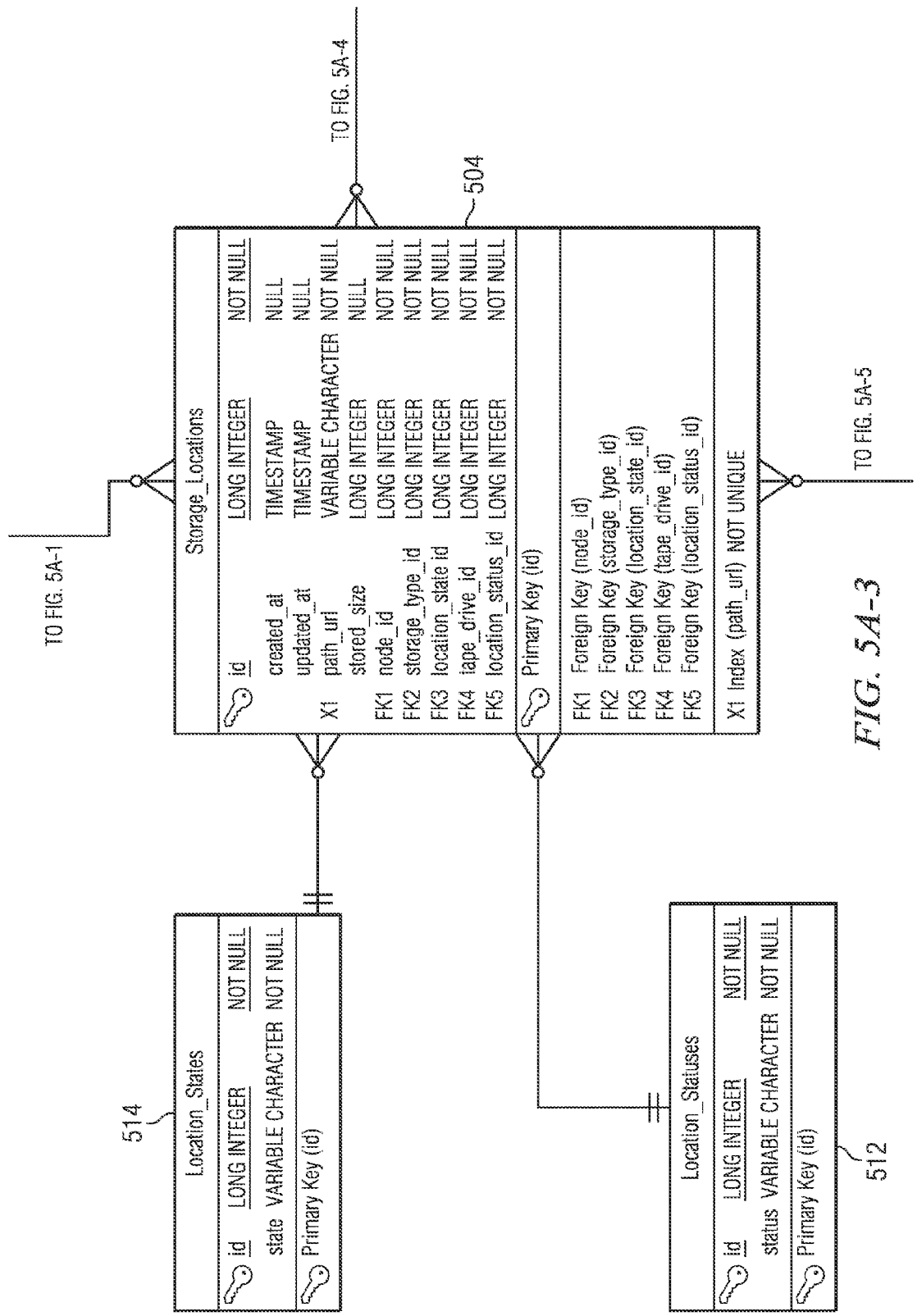

Turning first to FIG. 5A, one embodiment of a table schema for the storage of data relating to files and directories is depicted. In this schema, there is a node table 502, a storage location table 504, a storage media table 506, a disk table 508, a storage type table 510, a location statuses table 512, a Disk to Tape File System (used to refer to embodiments of an implementation of a file system using an Archive Node, also known by the acronym DTFS) settings table 516, DTFS users table 518, DTFS groups table 520, tape drives table 522, tapes table 524 and storage method types table 526.

Storage locations table 504 may comprise information on locations where data can be stored in conjunction with an Archive Node and thus entries in the storage location table 504 may be linked to entries in the storage media table 506. Entries in storage media may, in turn, be linked to entries in the disk table 508 that are associated with a data store of the Archive Node and entries in tapes table 524 that are associated with tapes in the tape library of the Archive Node. Entries in storage locations table 504 may also be linked to entries in tape drives table 522 that are associated with drives in the tape library of the Archive Node. Entries in the storage location table 504 may also be associated with a state and a status as represented by entries in the location states table 514 or the location statuses table 512.

Nodes table 502 comprises entries which are associated with a file or a directory as presented by the FUSE file system. In general the top level directory used by a FUSE file system of an archive node appliance can be a universally unique identifier (UUID) associated with the archive node appliance. Examples of such an identifier include, but are not limited to, a serial number, a software license number or other unique identifier. The use of a UUID as the top level directory by archive node appliances ensures that path names to files stored by that archive node appliance will not conflict with the path names used at a second archive node appliance if the tape if transferred to the second archive node appliance. For an implementation that stores hash codes for stub files, the stub file hash codes may be stored as part of node table 502 or elsewhere.

Entries in the node table 502 are linked with entries in the DTFS users table 518 where these entries may represent users of the DTFS file system (which may be defined by an administrator, based on the network based file system implemented by the Archive Node, etc.). Each of the entries in node table 502 may also be linked with entries in the storage location table 504 such that a link between an entry in the node table 502 associated with a file or directory may be linked with one or more entries in the storage location table 504 associated with a disk or tape where that file or directory is stored.

In the case in which an archive node appliance is part of a Windows Active Directory domain, active directory does not use Unix-like user IDS and group IDs to identify users. Active directory uses strings referred to as security identifiers (SID) for this purpose. Accordingly, the DTFS user table 518 and DTFS groups table 520 may include an entry for a user group SID that links the SID to the DTFS user id and, if applicable, to the appropriate Unix user ID (UID) and group ID (GID).

Figures 1, 5B:
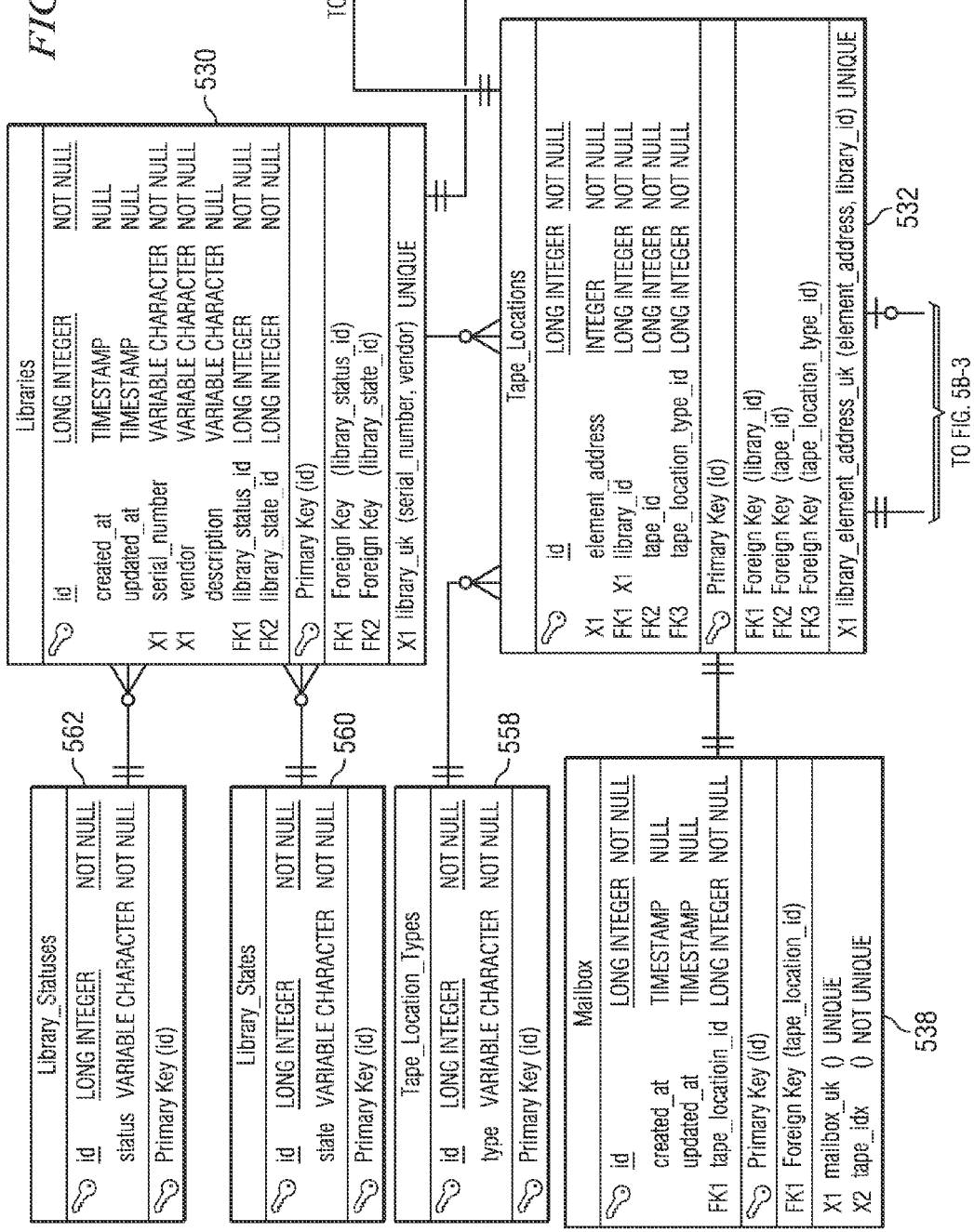
Figures 2, 5B:
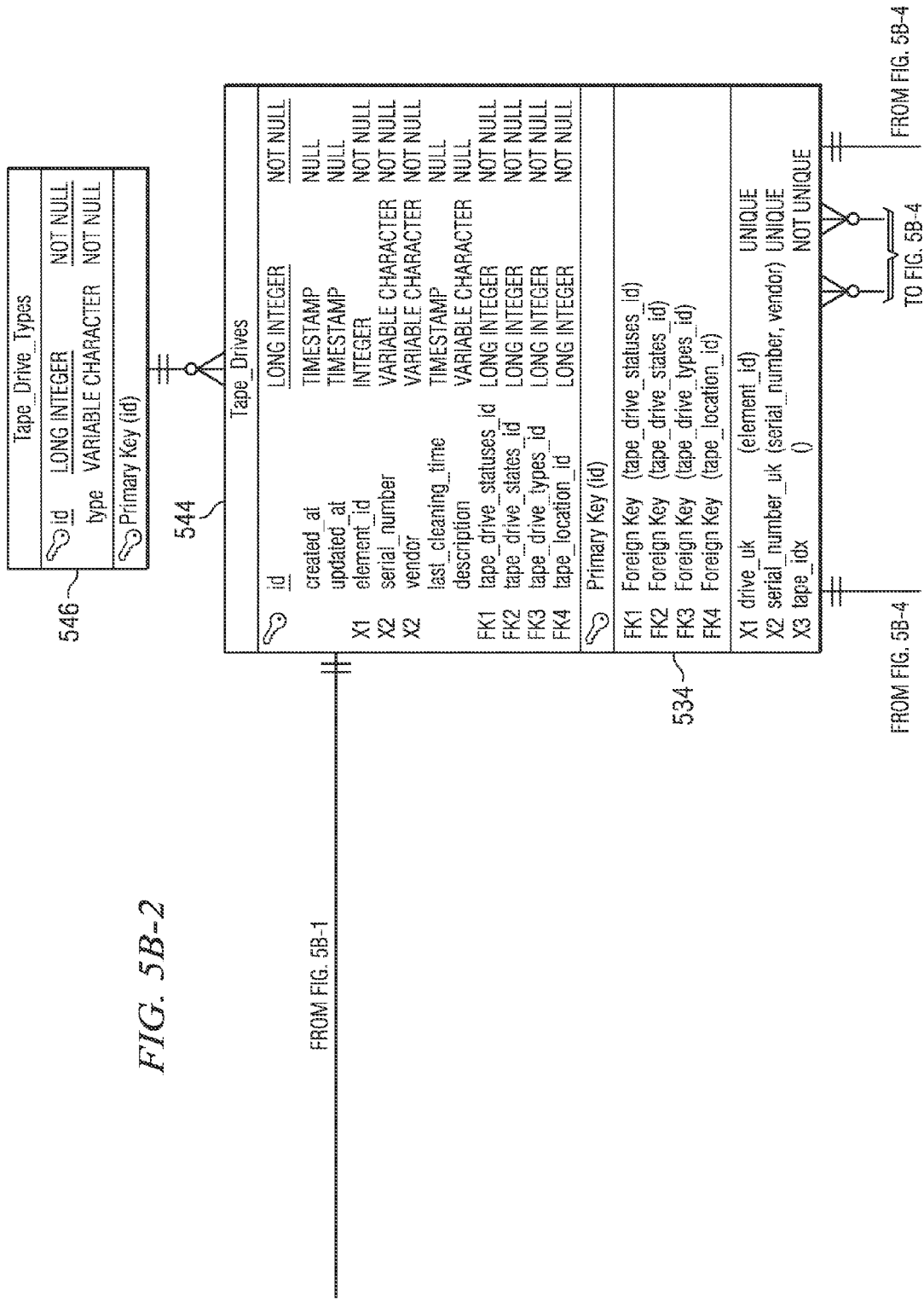
Figures 3, 5B:
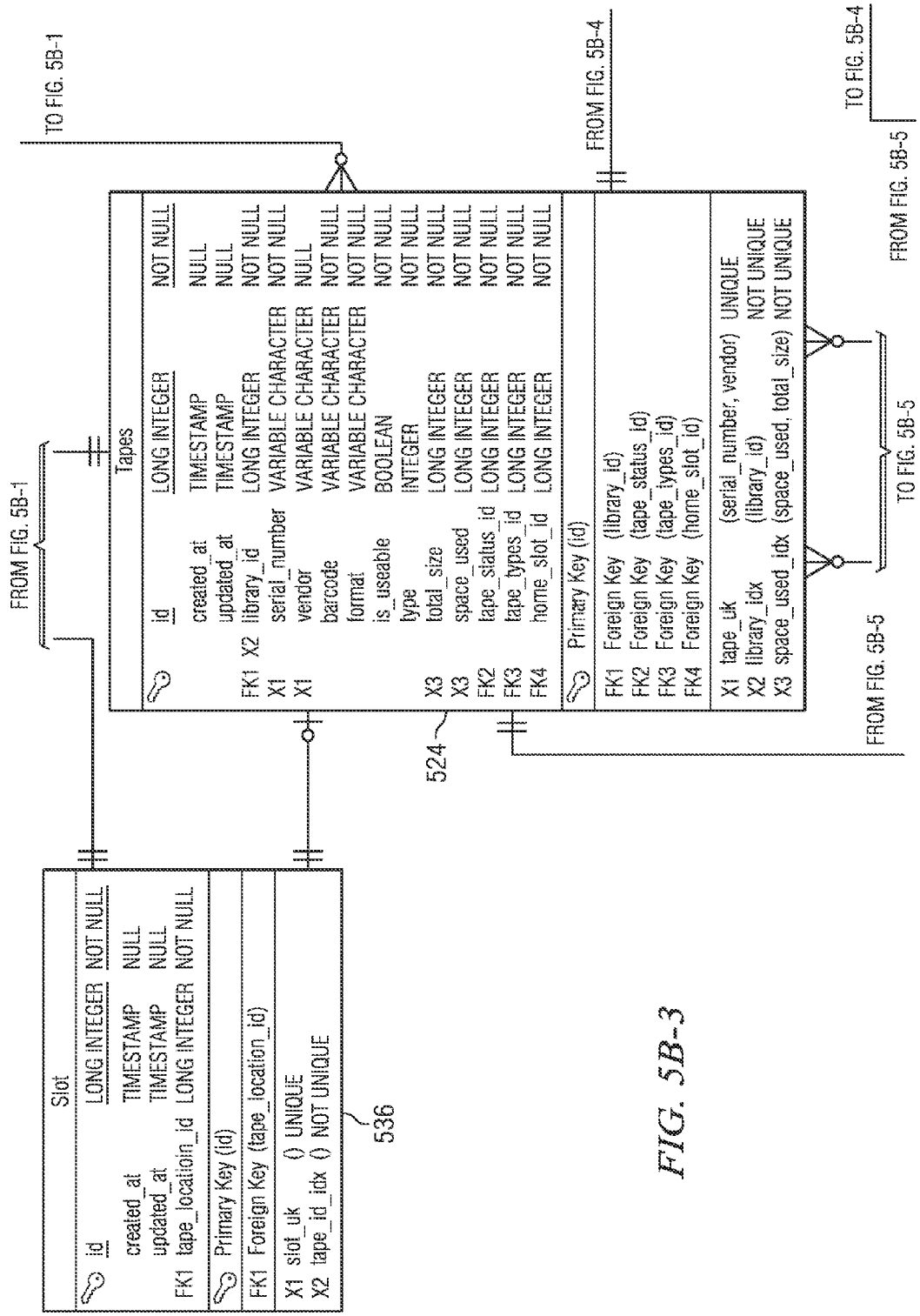
Figures 4, 5B:
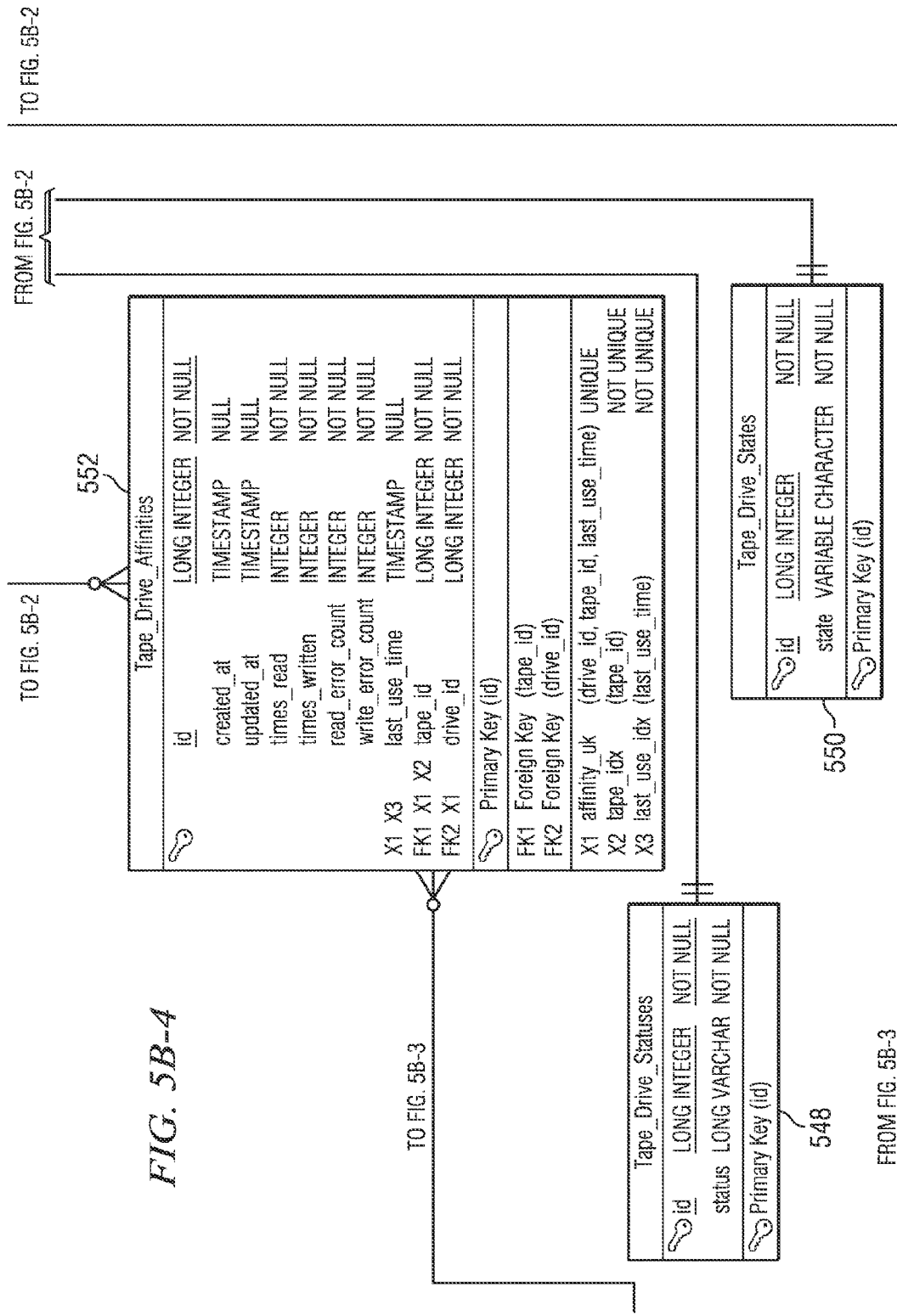

Moving now to FIG. 5B one embodiment of a table schema for the storage of data relating to tapes and tape libraries of an Archive Node is depicted. In this schema, there is a tapes table 524, tape locations table 532, libraries table 530, tape statuses table 542, tape types table 540, library statuses table 562, library states table 560, tape location types table 558, mailbox table 538, slot table 536, tape sessions table 554, tape micro sessions table 556, tape drive types table 546, tape drives table 534, tape drive affinities table 552, tape drive statues table 548 and tape drive states table 550.

Entries in tapes table 524 may be associated with an entry in tape locations table 532 associated with a location of tape in a tape library (for example, a slot, drive, etc.). Each of the entries in tape location table 532 may be associated with an entry in slot table 536 associated with a slot in a tape library or an entry in tape drives table 544 associated with a drive in the tape library. Furthermore, entries in tape locations table 532 and tapes table 524 are linked with an entry in libraries table 530 associated with a tape library of the Archive Node (of which there may be one or more, as discussed above). In this manner, an entry in tapes table 524 associated with a tape can be associated with an entry in library table 530, slot table 536 or tape drive table 544 associated with the location of that tape.

Entries in tape drive table 544 may be also linked to an entry in tape drive types table 546 associated with a type of the drive, or an entry in tape drive statuses table 548 or tape drive states table 550 associated with a statuses or state of a tape drive. Entries in tapes table 524 may also be linked to entries in tape status table 542 and tape types table 540 associated with a type or a status of a tape.

Figures 5, 5B:
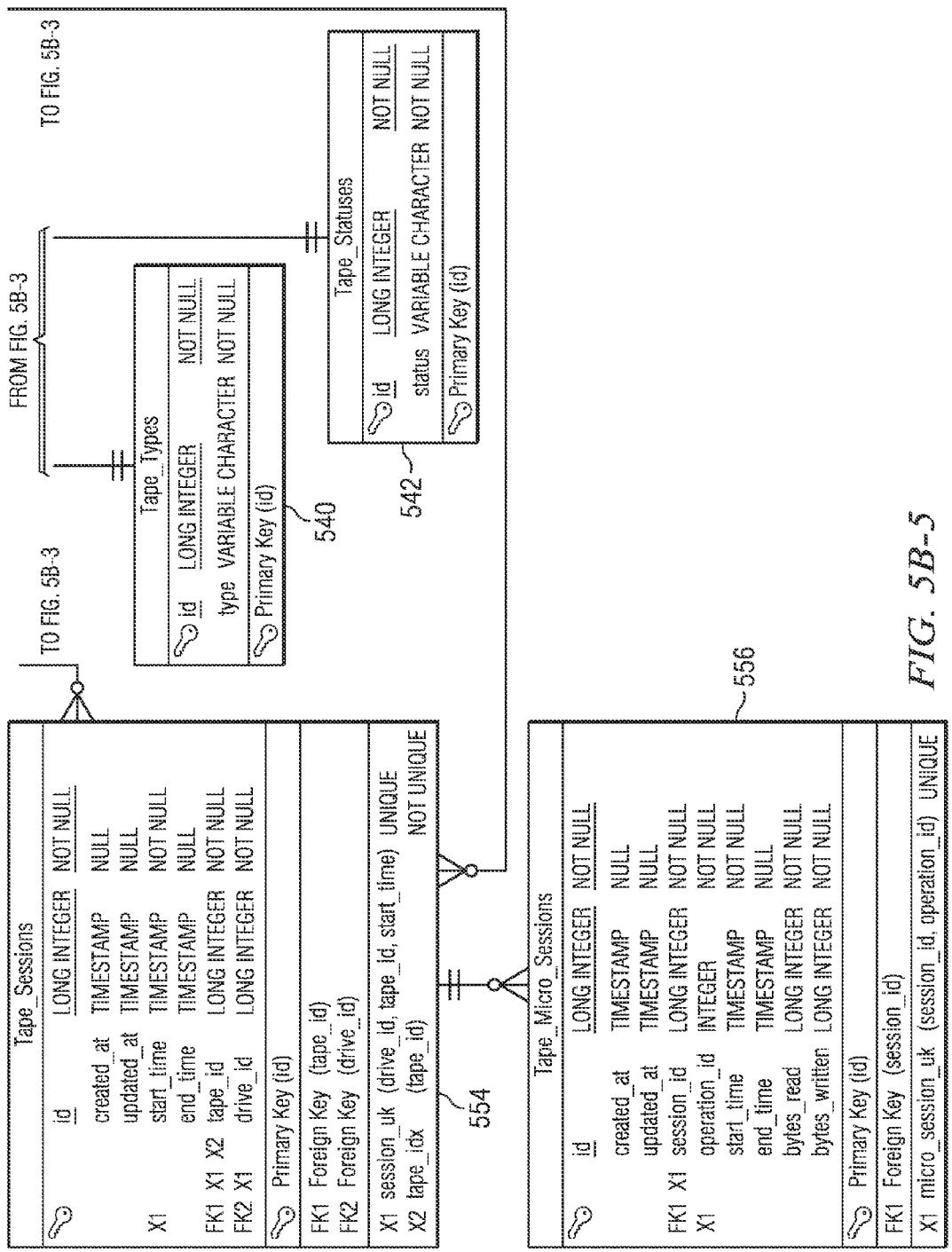
Figures 2, 5C:
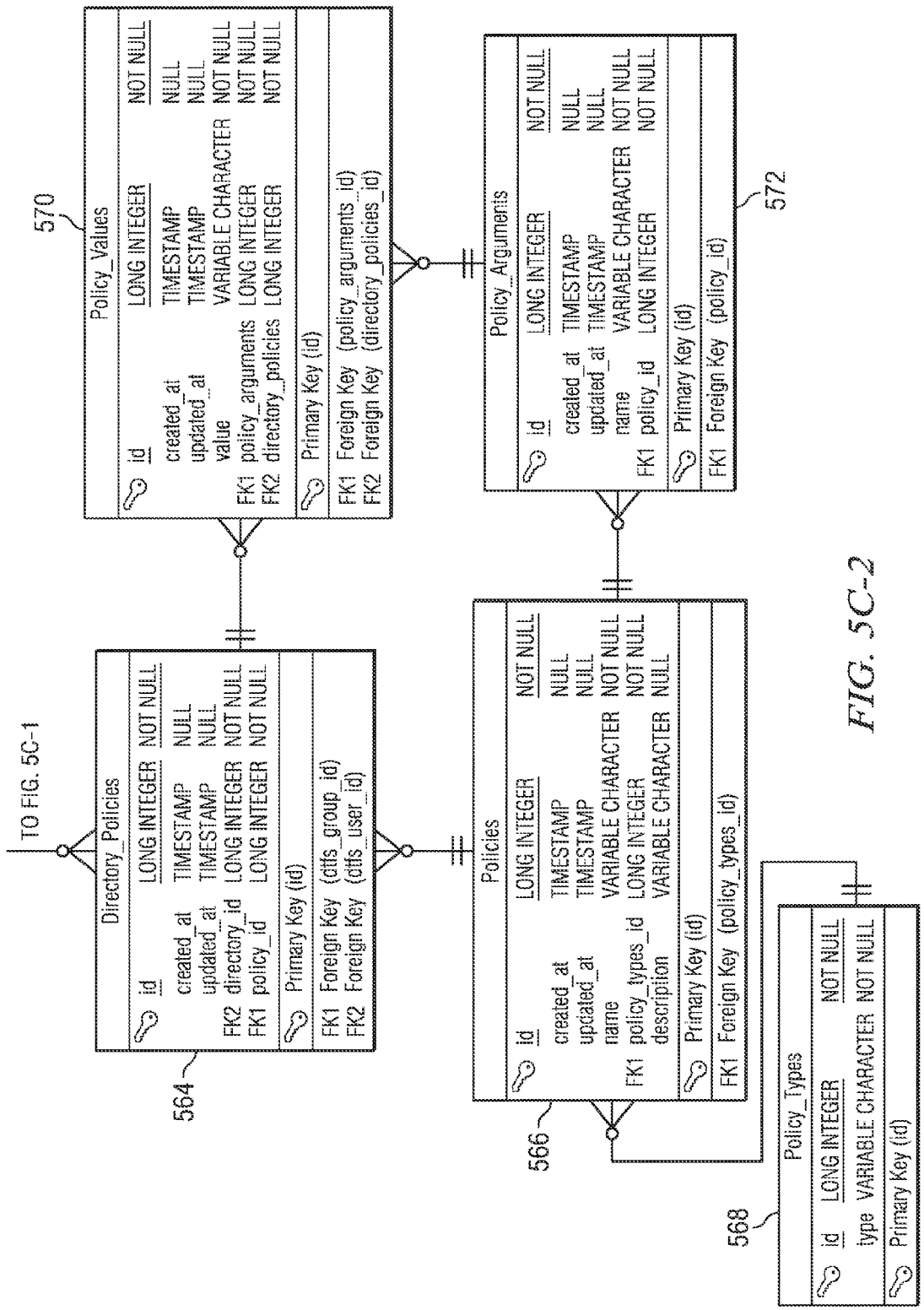

Turning to FIG. 5C one embodiment of a table schema for the storage of data relating to policies applicable to directories in an Archive Node is depicted. In this schema, there is nodes table 502, directory policies table 564, policies table 566, policy types table 568, policy values table 570 and policy arguments table 572. Entries in directory policies table 564 may be associated with polices to be applied to directories (and thus to files stored in those directories). Entries in directory policies table 564 may be linked to entries in node table 502 associated with a directory. In this manner, entries in directory policies table 564 associated with policies to be applied to directories may be linked to entries in nodes table 502 associated with a directory against which that policy is to be applied. It will be noted that a similar schema could be utilized to associate file policies with files, share policies with shares, etc.

Entries in directory policies table 564 may also be linked to an entry in policies table 566 that may be associated with a particular policy. Entries in policies table 566 may, in turn, be linked with an entry in policy types table 568 that is associated with a type of policy (for example, encryption or compression policy, number of copies to keep, replication, etc.). Thus, an entry in policies table 566 associated with a particular policy may be linked with an entry in policy type table 568 associated with the type of that policy.

Figure 5D:
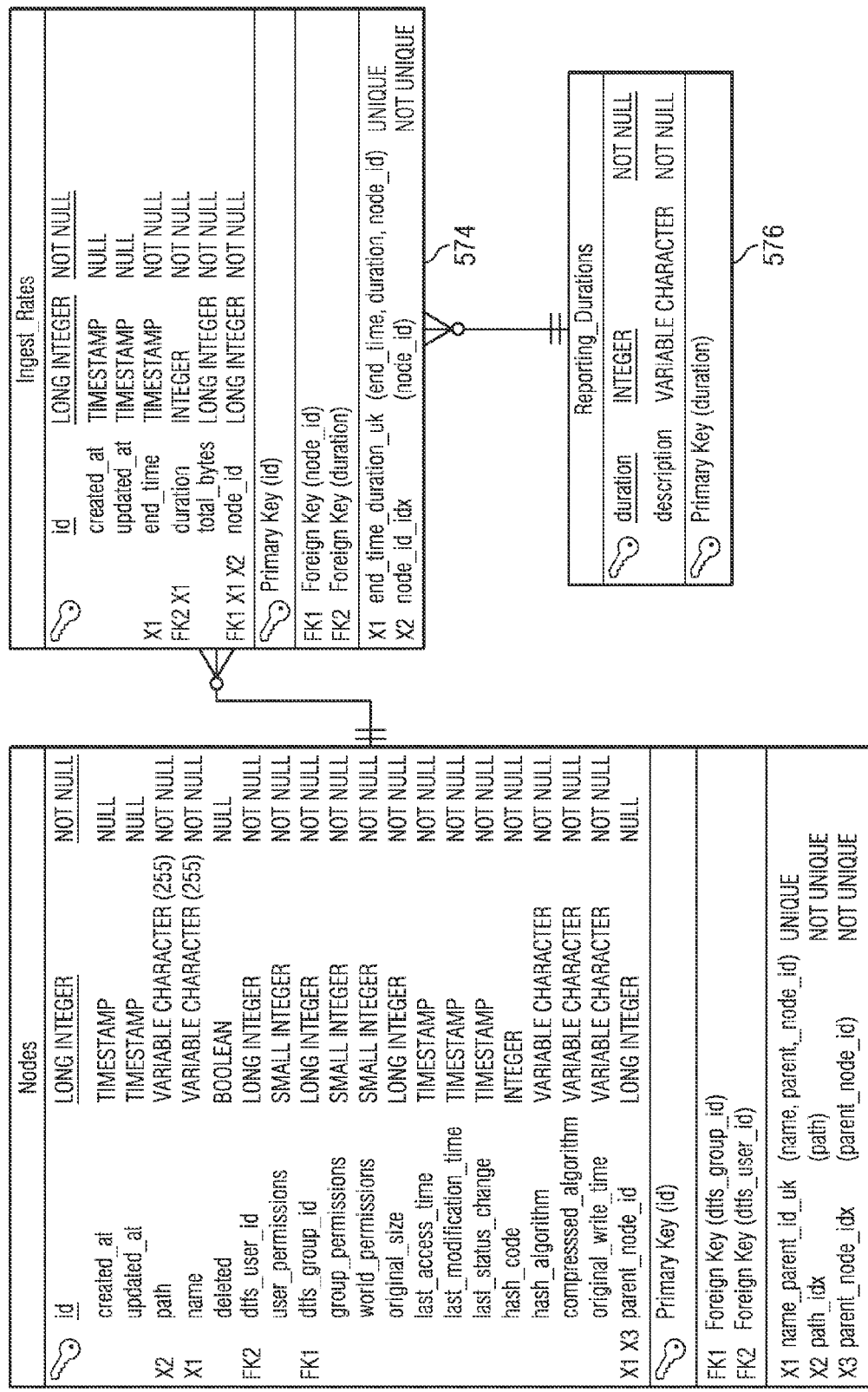

FIG. 5D depicts one embodiment of a table schema for collecting data on nodes in an Archive Node. In this schema, there is nodes table 502, ingest rates table 574 and reporting durations table 576. Thus, entries in the node table 502 can be linked to entries in ingest rates table 574 associated with statistics on the creation, reception, storage, migration, etc. of a file or directory.

FIG. 5 is provided by way of example and not limitation and the archive node appliance may store other metadata for files, directories, users, etc. According to one embodiment, for example, the FUSE file system may support extended attributes that are not used directly by the FUSE file system, but can be stored by clients and exposed through the FUSE file system. Extended attributes for a file or directory may be stored in the node table 502 for the file or directory other table. For example, a media management system may organize files based on the type of project with which the media is associated and therefore include an extended attributes such as project:soundtrack for files.

From a review of the above, it will be apparent that embodiments of such Archive Nodes may provide a highly effective manner of implementing a network based file system using a tape library. In some instances, however, it may be desired to provide a high level of availability or increased performance in conjunction with network based file systems. As such, in certain embodiments Archive Node Appliances may be clustered to provide increased performance or a higher degree of fault tolerance as described, for example, in U.S. patent application Ser. No. 13/109,192, entitled "System and Method for Implementing a Networked File System Utilizing a Media Library", filed May 17, 2011, which is hereby fully incorporated by reference herein.

Figure 6:
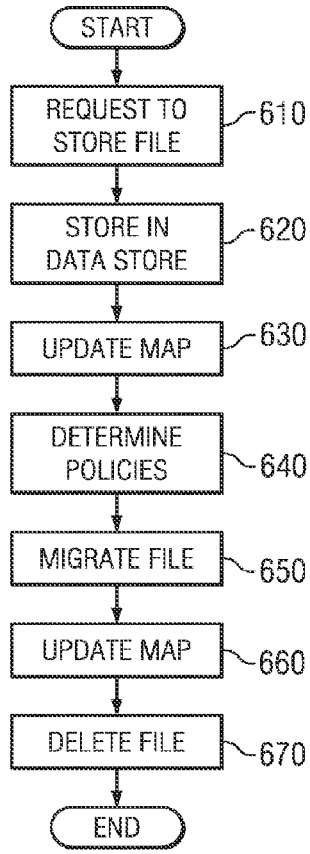
FIG. 6 is a flow chart illustrating one embodiment of a method for storing a file.

Referring now to FIG. 6, a method for storing a file using an embodiment of an Archive Node, including an Archive Node Appliance is depicted. At step 610 a request (which may comprise multiple commands in a file system protocol) to store a file may be received at the Archive Node Appliance, where the file may be associated with a name and a path as visible through the network based file system implemented by the Archive Node Appliance. For example, the path of the file may be path/patient_records and the file name may be Patient1.doc. The file is then stored on a location on the data store of the Archive Node Appliance at step 620, where the file may have a different name and be located at a path associated with the data store. For example, the path of the file as stored on the data store may be /data3 and the file name may be 550e8400-e29b-41d4-a716-446655440000.

In one embodiment, as discussed above, the file is stored in the data store according to one or more policies that apply to that file. For example, if a policy that applies to the file (for example, the policy is associated with the location associated with the network based file system where the file is stored) specifies that the file should be compressed the file may be compressed before the file is stored in the data store. Similarly, if an applicable policy specifies that the file is to be encrypted the file may be encrypted before it is stored in the data store.

The map can then be updated at step 630 to associate the name and the path of the file as visible through the network based file system with the path and name of the file as stored on the data store. Thus, in this example the path /patient_records and file name Patient1.doc, as visible through the network based file system is associated with the path /data3 and file name 550e8400-e29b-41d4-a716-446655440000 associated with the file as stored in the data store.

Subsequently, one or more policies to be applied to the file can be determined at step 640. The policies may be applied in conjunction with the migration of the file at step 650. As discussed above, in one embodiment one policy may specify that a migration timeout period is to be applied to the file before the file is migrated. This migration timeout period may specify a time period such that an amount of time equal to the migration timeout period may be allowed to elapse before the file is migrated. Thus, if such a policy exists the migration timeout period may be allowed to elapse before the file is migrated.

To migrate the file, one or more tapes on which to store the file may be determined. This determination may be based on the policies that have been determined to apply to that file. For example, the number of tapes determined may be based on a policy specifying that the file is to be maintained on multiple tapes. If so, two different tapes on which to store the file may be determined. If a policy to apply to the file specifies that the file is to be encrypted a tape comprising encrypted data may be selected. Similarly, if a policy to apply to the file specifies that the file is to be compressed a tape comprising compressed data may be selected. Assume for purposes of example that the tape on which it is determined to store the file has a TapeID of AN02394.

Each of the tapes on which it is determined to store the file can then be loaded into a drive, if it is not already in a drive, and the LTFS file system mounted. Specifically, the tape may be located using the index that maintains the location of each of the tapes in the library and loaded into a drive. The file can then be copied from its location on the data store to a location on the tape. In one embodiment, a path that corresponds to the path of the file as visible through the network based file system may be created on the tape using the LTFS file system if it does not already exist. The file can then be saved using the name that corresponds to the name of the file as visible through the network based file system. Continuing with the above example, the path /patient_records may be created on the tape having TapeID AN02394 if it does not exist and the file may be saved as Patient1.doc on this tape.

In one embodiment, before or during the copying of the file to the mounted LTFS file system on the tape, actions may be taken to implement policies applicable to the file. For example, if a policy specifies that the file is to be replicated it may be sent to another Archive Node Appliance or if a policy that applies to the file specifies that the file should be compressed, the Archive Node Appliance can cause the file to be stored on a compressed tape. Similarly, if an applicable policy specifies that the file is to be encrypted the Archive Node Appliance can cause the file to be stored on an encrypted tape.

The map can then be updated at step 660 to associate the tape on which the file is stored, the name and the path of the file as visible through the network based file system, the path and name of the file as stored in the data store and the path and name of the file as stored on the tape. Thus, in this example the path /patient_records and file name Patient1.doc, as visible through the network based file system is associated with TapeID AN02394, the path /data3 and the file name 550e8400-e29b-41d4-a716-446655440000 associated with the file as stored in the data store.

At step 670 the file, or portions thereof, may be deleted from the data store. In some embodiments, as it is desired to maintain the first portion of a file in a read cache in the data store, all portions of the file except this first portion may be deleted from the data store. It will be noted therefore, that in certain embodiments, the path and name of the file in the map that is associated with the file as stored in the data store may describe the location of the first portion of the file stored in the read cache. The steps of FIG. 6 can be repeated as needed or desired.

Turning now to providing a file to a network file system interface client, an Archive Node Appliance may respond to read requests from a client using data from a stub file until the tape containing the file is mounted and data can be provided from the tape. However, in some cases, the read cache may be lost due to corruption, loss of a RAID set or the like. Therefore, in order to maintain the advantages of the stub files, the Archive Node Appliance may restore the read cache.

Figure 7:
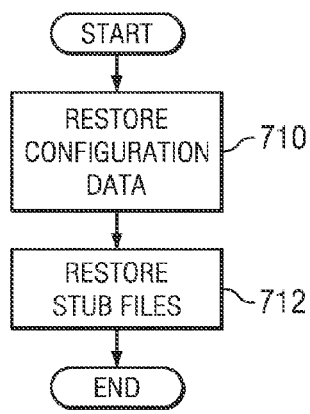
FIG. 7 is a flow chart illustrating one embodiment of restoring a read cache.

FIG. 7 depicts one embodiment a method for restoring a read cache using one embodiment of an Archive Node Appliance. At step 710 archive node configuration data such as the mapping data, index data, policies, file meta-data, tape-library data, etc. may be restored from backup storage if required. At step 712, the stub files can be restored. The stub files can be restored in a variety of manners. Stub files that were backed up can be restored from back up while stub files that were not backed up can be restored by reading the corresponding file from tape and storing the stub file in the read cache. In particular, stub files may be restored on an ad hoc basis when a network file system interface client requests to read the corresponding file.

A stub file can be restored to the same directory location at which the stub file was located prior to loss of the read cache. Thus, for example, if the stub file for /patient_records/Patient1.doc was stored at /data3/550e8400-e29b-41d4-a716-446655440000 prior to loss of the read cache, the stub file can be restored to location /data3/550e8400-e29b-41d4-a716-446655440000, (which may be on a new hard drive). In other cases, the stub file may be restored to a new directory location. The map can be updated to associate path /patient_records and file name Patient1.doc with the new location in the data store.

Figure 8:
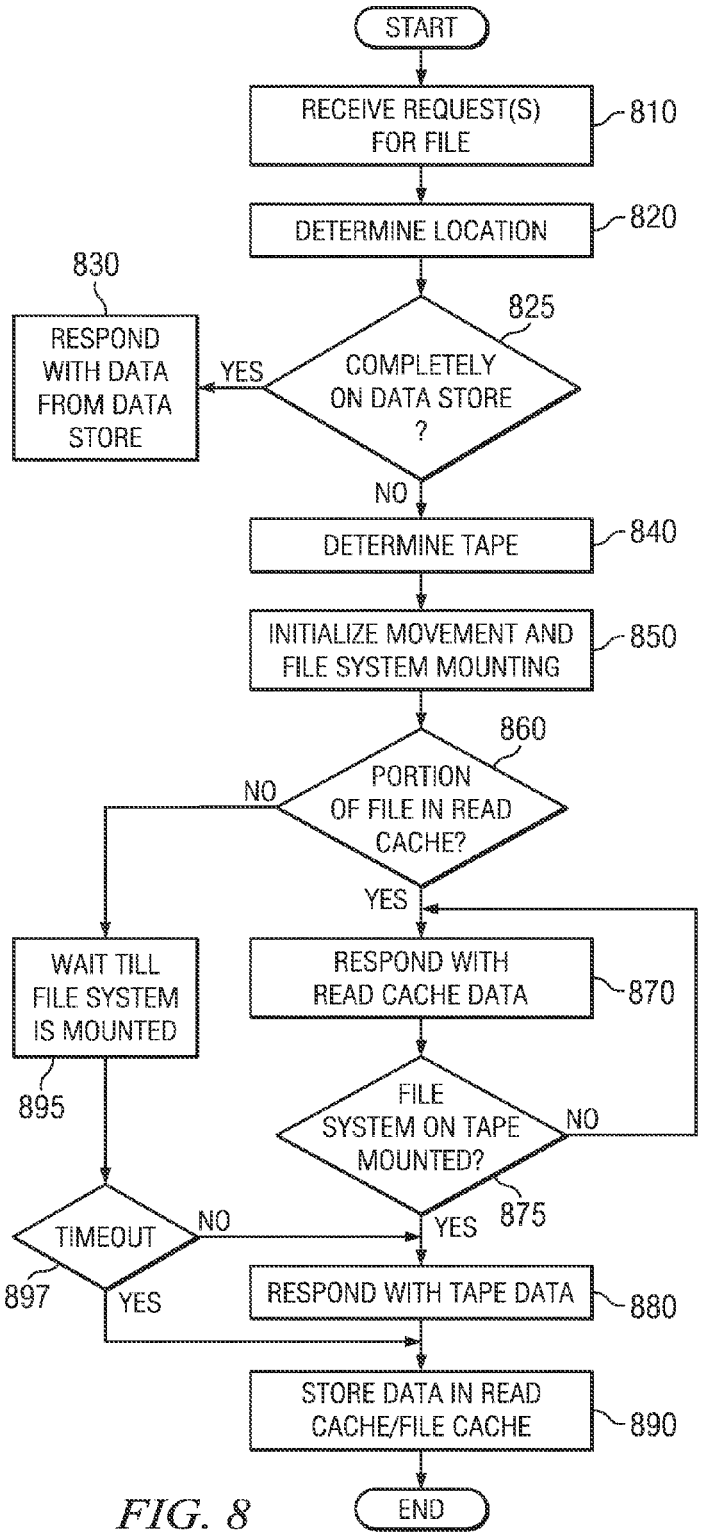
FIG. 8 is a flow chart illustrating one embodiment of ad hoc restoration of a stub file.

Ad hoc restoration of stub files can be integrated with replying to read requests from network file system interface clients. FIG. 8 depicts one embodiment of a method for reading a file using an embodiment of an Archive Node appliance. At step 810, a request to read a file may be received. This request may comprise multiple commands in a file system protocol as discussed above. The location of the file can be determined at step 820, where the file may be located in the data store of the Archive Node Appliance, on a tape in the tape library or both. If the requested file is completely on the data store (e.g., as determined at step 825), the read and subsequent requests may be responded to using the file as stored in the data store (step 830). The file may be completely on the data store for a variety of reasons, for example, the file has been stored on the data store, but a migration timeout period associated with the file has not yet expired and thus the file has not yet been migrated; the file has been migrated but has not been deleted; the file was previously migrated but was subsequently read and placed in the file cache on the data store; etc.

If the file is not completely in the data store, the tape on which the file is located may be determined at step 840. The movement of the tape into a drive, if needed, and the mounting of the file system on the tape may be initiated at step 850. Further, it can be determined if the first portion of the file (e.g., the stub file) is in the read cache at step 860. If the first portion is in the read cache it may be used to respond to the initial requests for file data at step 870 and some number of subsequent requests until the proper tape volume is mounted (see e.g., step 875). As described in U.S. patent application Ser. No. 13/267,665, entitled "System, Method and Computer Program Product for Trickling Data to a Host," filed Oct. 6, 2011, which is hereby fully incorporated by reference herein, data may be trickled from the read cache to a client to allow the tape time to load.

Prior to responding to the read request, a hash code can be generated for the stub file and compared to a stored hash code for that stub file. If the generated and stored hash codes for the stub file do not match an error can be generated or other action taken. If the generated and stored hash codes do match, the stub file may be used to respond to the read request.

When the file system on the tape is mounted, the file on the tape may be read and used to respond to subsequent requests for file data at step 880. When responding to the requests for file data using the file on the tape, the file may be read into a buffer and data from the buffer used to respond to requests. In addition, data from the buffer may be transferred to the data store (step 890) so that, for example, the entire file can be stored in the data store.

If the Archive Node Appliance is responding to requests for file data from the tape, but the client is requesting data at an insufficient rate to maintain tape streaming, the Archive Node Appliance may switch to using data from the file cache to respond to requests from the client for the file data while still streaming data to the buffer in order to populate the file cache. Thus, with respect to network file system interface clients, the Archive Node Appliance may switch from providing file data from the data store to providing the file data from the tape as needed.

Returning to step 860, if there is no stub file in the data store when a file is requested by the network file system interface client, the Archive Node Appliance can wait for the volume containing the requested file to be mounted (step 895). If the requesting host does not time out, the file data may be read from tape and used to respond to the requests for file data at step 880. Furthermore, the file data can be stored in the data store (step 890) to populate the read cache and file cache. If the client requests file data at an insufficient rate to maintain tape streaming, the Archive Node Appliance may switch to using data from the data store to respond to requests for the file data while still continuing to populate the data store with file data from the media.

There is some chance that a requesting client will timeout (e.g., as determined at decision block 897) before a tape volume can be mounted and data provided to the client. In such a case, the Archive Node Appliance can still mount the volume so that tape data can be read into the data store (step 890). Enough tape data can be read and stored in the data store to populate the read cache with a stub file corresponding to the requested file. The Archive Node Appliance may continue to populate the data store with data read from the media until the entire file is stored in the data store. At a later time, a portion of the file data can be deleted from the data store, leaving the stub file.

Thus, stub files can be recovered on an ad hoc basis by populating the stub file when the corresponding file is requested by a network file system interface client. In such an implementation, resources are conserved because only the stub files for files that are needed are recovered.

In addition to storing the stub file, a hash code for the stub file can be generated and stored for the stub file. This can be done once there is sufficient data in the data store to form the stub file or after the entire file is stored in the read cache.

Although the invention has been described with respect to specific embodiments thereof, these embodiments are merely illustrative, and not restrictive of the invention. The description herein of illustrated embodiments, including the description in the Abstract and Summary, is not intended to be exhaustive or to limit the invention to the precise forms disclosed herein (and in particular, the inclusion of any particular embodiment, feature or function within the Abstract or Summary is not intended to limit the scope to such embodiment, feature or function). Rather, the description is intended to describe illustrative embodiments, features and functions in order to provide a person of ordinary skill in the art context without limiting the invention to any particularly described embodiment, feature or function, including any such embodiment feature or function described in the Abstract or Summary. While specific embodiments and examples are described herein for illustrative purposes only, various equivalent modifications are possible within the spirit and scope of this disclosure, as those skilled in the relevant art will recognize and appreciate. As indicated, these modifications may be made in light of the foregoing description of illustrated embodiments and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nano-engineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A system for recovering a read cache comprising:
   a media library, comprising:
      a set of drives, and
      a set of media; and
   an archive node appliance coupled to the media library and a set of hosts, the archive node appliance comprising a processor, a data store and a computer readable medium storing a set of computer executable instructions executable on the processor to:
      maintain a read cache comprising portions of files stored on the set of media;
      receive a request from a network file system interface client for a first file presented as being at a first location in a first file system, the first location comprising a first path;
      locate the first file at a second location on a media of the media library, the second location comprising a second path in a second file system, the second path including at least a portion of the first path;
      read the first file from the media of the media library; and
      populate the read cache with a stub file for the first file using file data read from the second location on the media.

2. The system for recovering a read cache of claim 1, wherein the set of computer executable instructions are further executable to:
   if the read cache contains a preexisting stub file for the first file, generate a hash code for the preexisting stub file and compare the generated hash code to a stored hash code for the preexisting stub file.

3. The system for recovering a read cache of claim 2, wherein the set of computer executable instructions are further executable to:
   if the generated hash code does not match the stored hash code, generate an error.

4. The system for recovering a read cache of claim 2, wherein the set of computer executable instructions are further executable to:
   if the generated hash code does not match the stored hash code, take an action.

5. The system for recovering a read cache of claim 1, wherein the set of computer executable instructions are further executable to:
   generate a hash code for the stub file populated in the read cache.

6. The system for recovering a read cache of claim 1, wherein the set of computer executable instructions are further executable to:
   for one or more clients requesting data at an insufficient rate to maintain tape streaming, switch from responding to the one or more clients using data from the tape to responding to the one or more clients using data from the read cache or the data store.

7. The system for recovering a read cache of claim 1, wherein the set of computer executable instructions are further executable to:
   populate the data store with the first file using file data read from the media.

8. A computer program product comprising a non-transitory computer readable medium storing a set of computer executable instructions comprising instructions for:
   maintaining a read cache of portions of files stored on media of a media library;
   receiving a request from a network file system interface client for a first file presented as being at a first location in a first file system, the first location comprising a first path;
   locating the first file at a second location on a media of the media library, the second location comprising a second path in a second file system, the second path including at least a portion of the first path;
   reading the first file from the media of the media library; and
   populating the read cache with a stub file for the first file using file data read from the second location on the media.

9. The computer program product of claim 8, wherein the set of computer executable instructions further comprise instructions for:
   if the read cache contains a preexisting stub file for the first file, generating a hash code for the preexisting stub file and comparing the generated hash code to a stored hash code for the preexisting stub file.

10. The computer program product of claim 9, wherein the set of computer executable instructions further comprise instructions for:
    if the generated hash code does not match the stored hash code, generating an error.

11. The computer program product of claim 9, wherein the set of computer executable instructions further comprise instructions for:
    if the generated hash code does not match the stored hash code, taking an action.

12. The computer program product of claim 8, wherein the set of computer executable instructions further comprise instructions for:
    generating a hash code for the stub file populated in the read cache.

13. The computer program product of claim 8, wherein the set of computer executable instructions further comprise instructions for:
    for one or more clients requesting data at an insufficient rate to maintain tape streaming, switching from responding to the one or more clients using data from the tape to responding to the one or more clients using data from the read cache or the data store.

14. The computer program product of claim 8, wherein the set of computer executable instructions further comprise instructions for:

populating the data store with the first file using file data read from the media.

15. A method for recovering a read cache comprising:

maintaining a read cache comprising portions of files stored on media of a media library;

receiving a request from a network file system interface client for a first file presented as being at a first location in a first file system, the first location comprising a first path;

locating the first file at a second location on a media of the media library, the second location comprising a second path in a second file system, the second path including at least a portion of the first path;

reading the first file from the media of the media library; and populating the read cache with a stub file for the first file from file data read from the second location on the media.

16. The method of claim 15, further comprising:

if the read cache contains a preexisting stub file for the first file, generating a hash code for the preexisting stub file and comparing the generated hash code to a stored hash code for the preexisting stub file.

17. The method of claim 16, further comprising:

if the generated hash code does not match the stored hash code, generating an error.

18. The method of claim 16, further comprising:

if the generated hash code does not match the stored hash code, taking an action.

19. The method of claim 15, further comprising:

generating a hash code for the stub file populated in the read cache.

20. The method of claim 15, further comprising:

for one or more clients requesting data at an insufficient rate to maintain tape streaming, switching from responding to the one or more clients using data from the tape to responding to the one or more clients using data from the read cache or the data store.

21. The method of claim 15, further comprising:

populating the data store with the first file using file data read from the media.

* * * * *